US011460701B2

(12) United States Patent
Lee

(10) Patent No.: US 11,460,701 B2
(45) Date of Patent: Oct. 4, 2022

(54) DISPLAY WAVEGUIDE WITH A HIGH-INDEX PORTION

(71) Applicant: Facebook Technologies, LLC, Menlo Park, CA (US)

(72) Inventor: Hee Yoon Lee, Kirkland, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 0 days.

(21) Appl. No.: 16/740,205

(22) Filed: Jan. 10, 2020

(65) Prior Publication Data

US 2021/0124170 A1    Apr. 29, 2021

Related U.S. Application Data

(60) Provisional application No. 62/926,053, filed on Oct. 25, 2019.

(51) Int. Cl.
  *G02B 27/01* (2006.01)
  *F21V 8/00* (2006.01)

(52) U.S. Cl.
  CPC ....... *G02B 27/0172* (2013.01); *G02B 6/0016* (2013.01); *G02B 6/0035* (2013.01); *G02B 6/0038* (2013.01); *G02B 6/0076* (2013.01); *G02B 2027/0112* (2013.01)

(58) Field of Classification Search
  CPC ........................ G02B 27/0172; G02B 6/0016
  See application file for complete search history.

(56) References Cited

U.S. PATENT DOCUMENTS

| | | |
|---|---|---|
| 5,856,842 A | 1/1999 | Tedesco |
| 6,882,479 B2 | 4/2005 | Song et al. |
| 7,710,655 B2 | 5/2010 | Freeman et al. |
| 8,548,290 B2 | 10/2013 | Travers et al. |
| 8,837,050 B2 | 9/2014 | Hudman |
| 9,727,772 B2 | 8/2017 | Popovich et al. |
| 9,804,334 B2 | 10/2017 | Israel et al. |
| 9,933,684 B2 | 4/2018 | Brown et al. |
| 10,185,151 B2 | 1/2019 | Lee et al. |
| 10,393,930 B2 | 8/2019 | Tervo |
| 10,437,064 B2 | 10/2019 | Popovich et al. |
| 10,444,510 B1 | 10/2019 | Lee et al. |
| 10,539,799 B2 | 1/2020 | St. Hilaire |
| 10,598,938 B1 | 3/2020 | Huang et al. |
| 10,670,876 B2 | 6/2020 | Popovich et al. |
| 10,795,235 B2 | 10/2020 | Frank et al. |
| 10,884,244 B2 | 1/2021 | Yamada et al. |

(Continued)

OTHER PUBLICATIONS

PCT/US2020/052977 Search Report dated Dec. 16, 2020.
(Continued)

*Primary Examiner* — Sung H Pak
*Assistant Examiner* — Hoang Q Tran
(74) *Attorney, Agent, or Firm* — Peguignot + Myers; Matthew A. Pequignot

(57) ABSTRACT

A display waveguide configured for conveying image light to a viewer has a waveguide body whose refractive index varies in the thickness direction to include a high-index region between lower-index regions. Multi-layer and gradient index implementations are described. The waveguide transmits a portion of image light within the high-index region of the waveguide to provide a wider field of view.

19 Claims, 14 Drawing Sheets

(56) References Cited

U.S. PATENT DOCUMENTS

| | | | |
|---|---|---|---|
| 10,895,671 B1 | 1/2021 | Calafiore et al. | |
| 10,975,235 B2 | 4/2021 | Koop et al. | |
| 2003/0043157 A1 | 3/2003 | Miles | |
| 2007/0052959 A1 | 3/2007 | Cottard et al. | |
| 2010/0277803 A1 | 11/2010 | Pockett et al. | |
| 2010/0321781 A1 | 12/2010 | Levola et al. | |
| 2011/0242661 A1* | 10/2011 | Simmonds | G02B 27/145 385/27 |
| 2014/0140653 A1* | 5/2014 | Brown | G02B 27/0172 385/10 |
| 2016/0116739 A1 | 4/2016 | TeKolste et al. | |
| 2016/0252724 A1 | 9/2016 | Nikkhoo | |
| 2017/0219841 A1 | 8/2017 | Popovich et al. | |
| 2017/0248747 A1 | 8/2017 | Kim et al. | |
| 2017/0299860 A1 | 10/2017 | Wall et al. | |
| 2017/0307800 A1 | 10/2017 | Fattal | |
| 2018/0031752 A1 | 2/2018 | Ferrini et al. | |
| 2018/0074457 A1 | 3/2018 | Jolly et al. | |
| 2018/0084245 A1 | 3/2018 | Lapstun | |
| 2018/0120559 A1 | 5/2018 | Yeoh et al. | |
| 2018/0172995 A1 | 6/2018 | Lee et al. | |
| 2018/0227576 A1 | 8/2018 | Fattal | |
| 2018/0275350 A1 | 9/2018 | Oh et al. | |
| 2019/0056591 A1 | 2/2019 | Tervo et al. | |
| 2019/0094652 A1 | 3/2019 | Byrnes et al. | |
| 2019/0121142 A1 | 4/2019 | Tekolste et al. | |
| 2019/0285796 A1* | 9/2019 | Waldern | G02B 6/34 |
| 2020/0292840 A1 | 9/2020 | Popovich et al. | |
| 2020/0393682 A1 | 12/2020 | Mason | |

OTHER PUBLICATIONS

International Preliminary Report on Patentability for International Application No. PCT/US2020/052977, dated May 5, 2022, 7 pages.

* cited by examiner

DISPLAY WAVEGUIDE WITH A HIGH-INDEX PORTION

REFERENCE TO RELATED APPLICATION

This application claims priority to US Provisional Application No. 62/926,053 entitled "Display Waveguide with a High-Index Layer" filed on Oct. 25, 2019 and incorporated herein by reference in its entirety.

TECHNICAL FIELD

The present disclosure generally relates to optical display systems and devices, and in particular to waveguide displays and components therefor.

BACKGROUND

Head mounted displays (HMD), helmet mounted displays, near-eye displays (NED), and the like are being used increasingly for displaying virtual reality (VR) content, augmented reality (AR) content, mixed reality (MR) content, etc. Such displays are finding applications in diverse fields including entertainment, education, training and bio-medical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays provide images in angular domain, which can be observed by a user's eye directly, without an intermediate screen or a display panel. An imaging waveguide may be used to carry the image in angular domain to the user's eye. The lack of a screen or a display panel in a projector display enables size and weight reduction of the display.

BRIEF DESCRIPTION OF THE DRAWINGS

Embodiments disclosed herein will be described in greater detail with reference to the accompanying drawings which represent example embodiments thereof, in which like elements are indicated with like reference numerals, and wherein.

DETAILED DESCRIPTION

Figure 1:
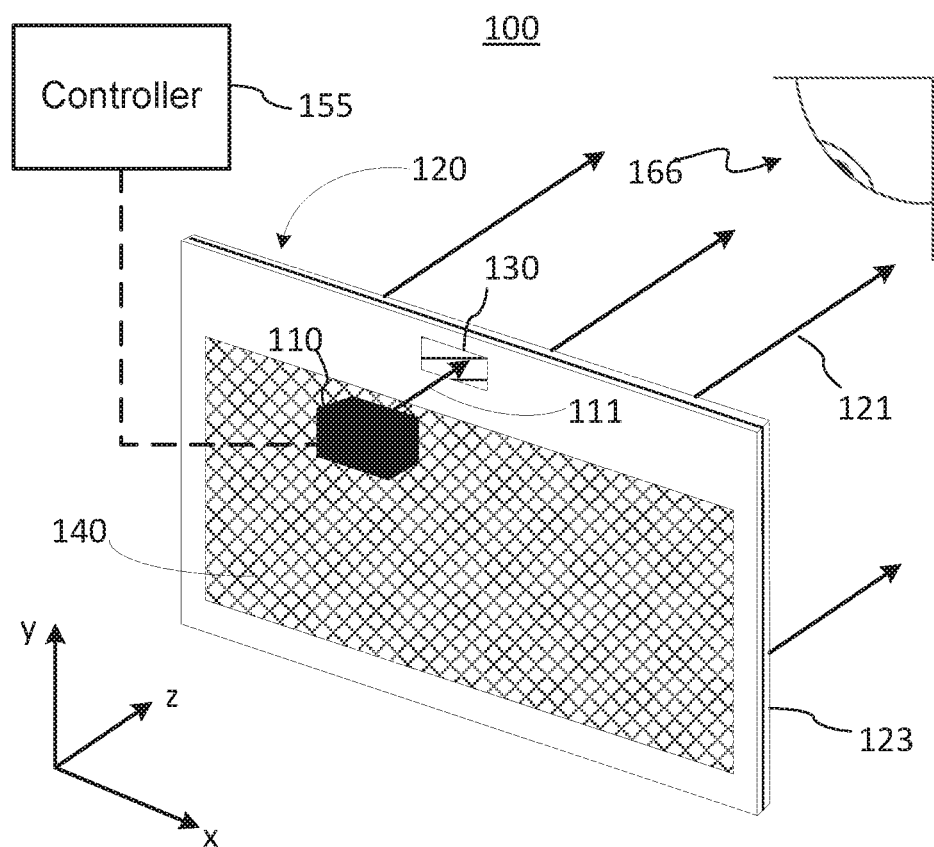
FIG. 1 is a schematic isometric view of a waveguide display system using a waveguide assembly for transmitting images to a user.

In the following description, for purposes of explanation and not limitation, specific details are set forth, such as particular optical and electronic circuits, optical and electronic components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second", and so forth are not intended to imply sequential ordering, but rather are intended to distinguish one element from another, unless explicitly stated. Similarly, sequential ordering of method or process steps does not imply a sequential order of their execution, unless explicitly stated.

Furthermore, the following abbreviations and acronyms may be used in the present document: HMD (Head Mounted Display); NED (Near Eye Display); VR (Virtual Reality); AR (Augmented Reality); MR (Mixed Reality); LED (Light Emitting Diode); FOV (Field of View); TIR (Total Internal Reflection); HI (High Index). The terms "NED" and "HMD" may be used herein interchangeably.

Example embodiments may be described hereinbelow with reference to polychromatic light that is comprised of three distinct color channels. The color channel with the shortest wavelengths may be referred to as the blue (B) channel or color, and may represent the blue channel of an RGB color scheme. The color channel with the longest wavelengths may be referred to as the red (R) channel or color and may represent the red channel of the RGB color scheme. The color channel with wavelengths between the red and blue color channels may be referred to as the green (G) channel or color, and may represent the green channel of the RBG color scheme. The blue light or color channel may correspond to wavelength about 500 nm or shorter, the red light or color channel may correspond to wavelength about 625 nm or longer, and the green light or color channel may correspond to a wavelength range 500 nm to 565 nm. It will be appreciated however that the embodiments described herein may be adapted for use with polychromatic light comprised of any combination of two or more, or preferably three or more color channels, which may represent different portions of a relevant optical spectrum.

An aspect of the present disclosure relates to a display system comprising a waveguide and an image light source coupled thereto, wherein the waveguide is configured to receive image light emitted by the image light source and to convey the image light received in a field of view (FOV) of the waveguide to an eyebox for presenting to a user. The term "field of view" (FOV), when used in relation to a display system, may relate to an angular range of light propagation supported by the system or visible to the user. A two-dimensional (2D) FOV may be defined by angular ranges in two orthogonal planes. For example, a 2D FOV of a NED device may be defined by two one-dimensional (1D) FOVs, which may be a vertical FOV, for example +\−20° relative to a horizontal plane, and a horizontal FOV, for example +\−30° relative to the vertical plane. With respect to a FOV of a NED, the "vertical" and "horizontal" planes or directions may be defined relative to the head of a standing person wearing the NED. Otherwise the terms "vertical" and "horizontal" may be used in the present disclosure with reference to two orthogonal planes of an optical system or device being described, without implying any particular relationship to the environment in which the optical system or device is used, or any particular orientation thereof to the environment.

An aspect of the present disclosure relates to a display waveguide that is configured for conveying image light to a viewer and that has a waveguide body whose refractive index varies in the thickness direction to include a high-index region between lower-index regions. Multi-layer and gradient index implementations are described. The waveguide transmits a portion of image light within the high-index region of the waveguide to provide a wider field of view.

An aspect of the present disclosure relates to a waveguide for conveying image light in a display system, the waveguide comprising a waveguide body having two outer surfaces and a thickness therebetween, the waveguide body comprising an input area and an output area, the waveguide body configured to guide the image light received at the input area toward the output area, wherein the waveguide body has a refractive index that varies in a direction of the thickness and is greater in a middle portion of the waveguide body between the outer surfaces than in portions of the waveguide body adjacent to the outer surfaces. The waveguide body may be contiguous. An input coupler may be disposed in the input area and configured to couple the image light into the waveguide body for propagating toward the output area. An output coupler may be disposed in the output area and configured to couple the image light out of the waveguide body for propagating toward an eyebox.

In some implementations the input coupler may be configured to couple the image light into the waveguide body in a range of propagation angles comprising a first propagation angle and a second propagation angle, so that first rays of the image light coupled into the waveguide body at the first propagation angle are guided toward the output area by total internal reflection at the outer surfaces of the waveguide body, while second rays of the image light coupled at the second propagation angle are guided within the middle portion of the waveguide body.

In some implementations the input coupler may comprise a first input grating disposed at least in part in the middle portion of the waveguide body so as to inject the image light directly into the middle portion. The output coupler may comprise a first output grating disposed at least in part in the middle portion of the waveguide body. In some implementations the output coupler may comprise a second output grating configured to redirect the image light received from the first output grating out of the waveguide body. The second output grating may be disposed at least in part in the middle portion of the waveguide body.

In some implementations the middle portion of the waveguide body may comprise a middle layer, and the waveguiding body may further comprise two outer layers sandwiching the middle layer, wherein the middle layer has a greater refractive index than the two outer layers. In some implementations at least one of the first and second output gratings may be disposed in the middle layer or at a surface thereof. In some implementations the waveguide body may comprise a plurality of layers, the plurality of layers comprising at least three layers having different refractive indices.

In some implementations the refractive index of the waveguide body varies from at least 2.3 in the middle portion to at most 1.9 at the outer surfaces thereof. In some implementations the refractive index of the waveguide body gradually varies in the thickness dimension, decreasing from a maximum value in the middle portion of the waveguide body toward lesser values at the two outer surfaces thereof.

An aspect of the disclosure relates to a display device comprising: a support structure for wearing on a head of a user; a light projector carried by the support structure and configured to emit image light; and, a first waveguide carried by the support structure and configured to convey at least a first portion of the image light from the light projector to an eyebox. The first waveguide may comprise a waveguide body having two outer surfaces and a thickness therebetween, the waveguide body comprising an input area and an output area, the waveguide body configured to guide the image light received at the input area toward the output area, wherein the waveguide body has a refractive index that varies in a direction of the thickness and may be greater in a middle portion of the waveguide body between the outer surfaces than in portions of the waveguide body adjacent to the outer surfaces. The first waveguide may further comprise an input coupler configured to couple the first portion of the image light into the waveguide body, and an output coupler configured to couple the first portion of the image light out of the waveguide body for propagating toward an eyebox.

In some implementations of the display device, the input coupler may comprise a first input grating disposed at least in part in the middle portion of the waveguide body, and the output coupler may comprise a first output grating disposed at least in part in the middle portion of the waveguide body, wherein the first output grating may be spaced apart from the first input grating in a first direction that may be orthogonal to a direction of the thickness.

In some implementations of the display device wherein the image light comprises a plurality of color channels, the first waveguide may be configured to couple at least a first color channel of the image light for guiding toward the eyebox.

In some implementations the display device may comprise a second waveguide carried by the support structure and configured to convey at least a second portion of the image light from the light projector to the eyebox, wherein the image light comprises a first color channel and a second color channel, and wherein the first waveguide may be configured to transmit the first color channel and the second waveguide may be configured to transmit the second color channel.

An aspect of the disclosure relates to a method for conveying image light from an image light source to an eyebox, the method comprising: directing the image light onto an input area of a waveguide comprising two opposed outer surfaces and a middle portion therebetween, the middle portion extending from the input area of the waveguide to an output area thereof, the middle portion having a greater refractive index than portions of the waveguide body adjacent to the opposed outer surfaces thereof; coupling the image light into the waveguide body at a range of propagation angles comprising a first propagation angle and a second propagation angle; and, propagating the image light in the waveguide from the input area to the output area so that first rays of the image light coupled into the waveguide at the first propagation angle are guided toward the output area by total internal reflection at the opposed outer surfaces of the waveguide, while second rays of the image light coupled into the waveguide at the second propagation angle propagate toward the output area within the middle portion of the waveguide body. The method may comprise using at least one output grating disposed in the middle portion of the waveguide body to couple the second rays out of the waveguide body. The method may comprise guiding at least one color channel of the image light predominantly within the middle portion of the waveguide.

An aspect of the present disclosure provides a waveguide for conveying image light in a display system, the waveguide comprising: a waveguide body having two outer surfaces and a thickness therebetween, the waveguide body comprising an input area and an output area, the waveguide body configured to guide the image light received at the input area toward the output area, wherein the waveguide body has a refractive index that varies in a direction of the thickness. An input coupler may be disposed in the input area and configured to couple the image light into the waveguide body for propagating toward the output area. An output coupler may be disposed in the output area and configured to couple the image light out of the waveguide body for propagating toward a viewing area.

In some implementations the refractive index may be greater at one of the outer surfaces than at the other of the outer surfaces. In some implementations the refractive index may be greater in a middle portion of the waveguide body between the outer surfaces than in portions of the waveguide body adjacent to the outer surfaces.

Example embodiments of the present disclosure will now be described with reference to a waveguide display. Generally a waveguide display may include an image light source such as a pixilated electronic display or a scanning projector assembly, a controller, and an optical waveguide configured to transmit image light from the image light source to an exit pupil for presenting images to a user. The image light source may also be referred to herein as a display projector, an image projector, or simply as a projector. Example display systems incorporating a display waveguide wherein features and approaches disclosed here may be used, include, but not limited to, a near-eye display (NED), a head-up display (HUD), a head-down display, and the like.

With reference to FIG. 1, there is illustrated a waveguide display 100 in accordance with an example embodiment. The waveguide display 100 includes an image light source 110, a waveguide 120, and may further include a display controller 155.

The image light source 110, which may be referred to herein as projector 110, is configured to emit image light 111. In some embodiments the image light source 110 may be in the form of, or include, a scanning projector. In some embodiments the scanning projector may include a light source, such as but not limited to a laser diode (LD) or a light-emitting diode (LED), and one or more scanning reflectors. In some embodiments the scanning projector may include a scanning light source. In some embodiments the image light source 110 may include a pixelated microdisplay, such as for example but not limited to a liquid crystal display (LCD), an organic light emitting display (OLED), an inorganic light emitting display (ILED), an active-matrix organic light-emitting diode (AMOLED) display, or a transparent organic light emitting diode (TOLED) display. In some embodiment the image light source 110 may include a linear array of light sources, such LEDs, LDs, or the like. In some embodiments it may include a 2D pixel array, and each pixel may be configured to emit polychromatic light. The image light source 110 may further include one or more optical components configured to suitably condition the image light. This may include, without limitation, expanding, collimating, correcting for aberrations, and/or adjusting the direction of propagation of the image light, or any other suitable conditioning as may be desired for a particular system and electronic display. The one or more optical components in the optics block may include, without limitations, one or more lenses, mirrors, apertures, gratings, or a combination thereof. In some embodiments the optics block of the image light source 110 may include one or more adjustable elements operable to scan the beam of light with respect to its propagation angle.

The waveguide 120 may comprise a waveguide body 123, an input coupler 130 in an input area of the waveguide, and an output coupler 140 in an output area of the waveguide. In some embodiments a waveguide stack composed of two or more waveguides that are stacked one over another may be used in place of the waveguide 120. The input coupler 130 may be disposed at a location where it can receive the image light 111 from the image light source 110. The input coupler 130, which may also be referred to herein as the in-coupler 130, is configured to couple the image light 111 into the waveguide 120, where it propagates toward the output coupler 140. The output coupler 140, which may also be referred to herein as the out-coupler, may be offset from the input coupler 130 and configured to de-couple the image light from the waveguide 120 for propagating in a desired direction, such as for example toward a user's eye 166. The out-coupler 140 may be greater in size than the in-coupler 130 to expand the image beam in size as it leaves the waveguide, and to support a larger exit pupil than that of the projector 110. In some embodiments the waveguide body 123 may be partially transparent to outside light, and may be used in AR applications. The waveguide 120 may be configured to convey a two-dimensional (2D) FOV from the input coupler 130 to the output coupler 140, and ultimately to the eye 166 of the user. Here and in the following description the display waveguide 120 and embodiments thereof may be described with reference to a Cartesian coordinate system (x,y,z), in which the (x,y) plane is parallel to the outer faces of the waveguide through which the waveguide receives and/or outputs the image light, and the z-axis is orthogonal thereto. In some embodiments the 2D FOV of waveguide 120 may be defined by a 1D FOV in the (y,z) plane and a 1D FOV in the (x,z) plane, which may also be referred to as the vertical and horizontal FOVs, respectively.

Figure 2:
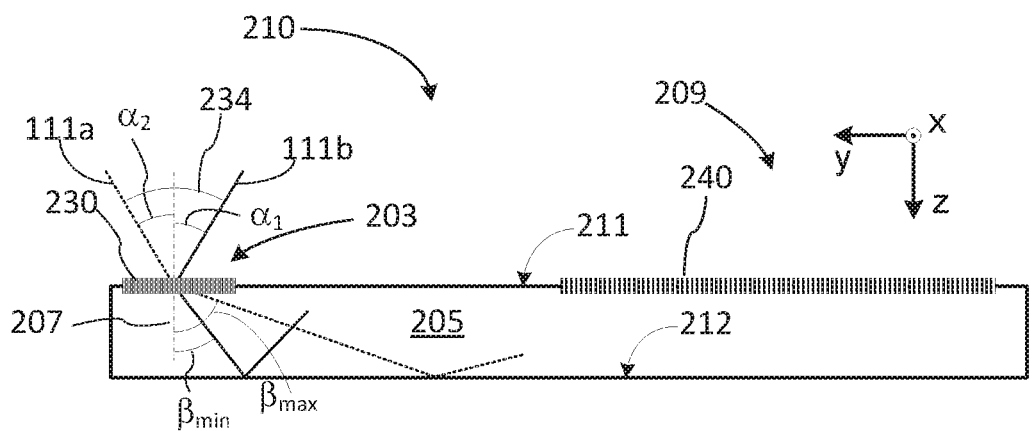
FIG. 2 is a schematic diagram illustrating the coupling of a color channel into a display waveguide and an input FOV therefor.

FIG. 2 schematically illustrates the coupling of light of a wavelength λ into a waveguide 210 for a range of incidence angles α. Waveguide 210 may represent the waveguide 120 of display 100, or any waveguide of a waveguide stack that may be used in place of the waveguide 120. Waveguide 210 may be a slab waveguide with a waveguide body that may be for example in the form of, or include, a substrate 205. The substrate 205 may be a thin plate of an optical material that is transparent in visible light, such as glass or suitable plastic or polymer as non-limiting examples. Main outer faces 211, 212 of waveguide 210, through which image light may enter or leave the waveguide, may be nominally parallel to each other. The refractive index n of the substrate material may be greater than that of surrounding media, and in some embodiments may be for example in the range of 1.4 to 2.0. In some embodiments, high-index materials may be used for the substrate 205 or a portion thereof. In some embodiments these materials may have an index of refraction n greater than about 2.2. In some embodiments these materials may have an index of refraction n greater than about 2.3. In some embodiments these materials may have an index of refraction n greater than about 2.5. Non-limiting examples of such materials are lithium niobate (LiNbO3), titanium dioxide (TiO2), gallium nitride (GaN), aluminum nitride (AlN), silicon carbide (SiC), CVD diamond, zinc sulfide (ZnS).

An in-coupler 230 may be provided in an input area 203 of the waveguide 210 and may be in the form of one or more diffraction gratings. An out-coupler 240, which may also be in the form of one or more diffraction gratings, may be disposed in an output area 209 of the waveguide, and may be laterally offset from the in-coupler 230, for example along the y-axis. In the illustrated embodiment the out-coupler 240 is located at the same face 211 of the waveguide 210 as the in-coupler 130, but in other embodiments it may be located at the opposite face 212 of the waveguide. Some embodiments may have two input gratings that may be disposed at main outer faces 211, 212 of the waveguide, and/or two output gratings that may be disposed at main outer faces 211, 212 of the waveguide, or superimposed at a same face or at a same plane within the waveguide. The gratings embodying couplers 230, 240 may be any suitable diffraction gratings, including volume and surface-relief gratings, such as for example blaze gratings. The gratings may also be volume holographic gratings. In some embodiments they may be formed in the material of the waveguide itself. In some embodiments they may be fabricated in a different material or materials that may be affixed to a face or faces of the waveguide at desired locations.

The in-coupler 230 may be configured to support an input FOV 234, which may also be referred to herein as the acceptance angle. The input FOV 234, which depends on wavelength, defines a range of angles of incidence α for which the light incident upon the in-coupler 230 is coupled into the waveguide and propagates toward the out-coupler 240. In the context of this specification, "coupled into the waveguide" means coupled into the guided modes of the waveguide or modes that have suitably low radiation loss. Light coupled into the waveguide that experiences total internal reflection (TIR) upon the waveguide's outer surfaces 211 and 212 may propagate within the waveguide with suitably low attenuation until it is redirected by an out-coupler. Thus waveguide 210 may trap light of a particular wavelength λ by means of TIR, and guide the trapped light toward the out-coupler 240, provided that the angle of incidence of the light upon the in-coupler 230 from the outside of the waveguide is within the input FOV 234 of the waveguide 210. The input FOV 234 of the waveguide is determined at least in part by a pitch p of the in-coupler grating 230 and by the refractive index n of the waveguide. For a given grating pitch p, the first-order diffraction angle β of the light incident upon the grating 230 from the air at an angle of incidence α in the (y, z) plane may be found from a diffraction equation (1):

$$n \cdot \sin(\beta) - \sin(\alpha) = \lambda/p. \quad (1)$$

Here the angle of incidence α and the diffraction angle β are positive if the corresponding wavevectors have components directed toward the out-coupler 240. Diffraction angle β defines the angle of propagation of the diffracted ray of the image light in the waveguide, and may also be referred to herein as the propagation angle. Equation (1) may be easily modified for embodiments in which light enters the waveguide 210 from a material with refractive index $n_c > 1$. Equation (1) holds for rays of image light with a plane of incidence normal to the groves of the in-coupler grating, i.e. when the plane of incidence of image light includes the grating vector of the in-coupler. In the illustrated example, the grating vector of the in-coupler may be directed along the y-axis.

Light experiencing TIR in a waveguide or a layer may be referred to herein as the in-coupled light or trapped light. The TIR condition for the diffracted light within the waveguide may be defined by equation (2):

$$n \cdot \sin(\beta) \geq 1, \quad (2)$$

where the equality corresponds to a TIR angle $\beta_c = \operatorname{asin}(1/n)$. The input FOV 234 of waveguide 210 spans between a first FOV angle of incidence $\alpha_1$ and a second FOV angle of incidence $\alpha_2$, which may be referred to herein as the FOV angles. The first FOV angle of incidence $\alpha_1$ corresponding to the right-most incident ray 111b in FIG. 2A may be defined by the TIR angle $\beta_c$ of the in-coupled light, i.e. light trapped within the waveguide:

$$\alpha_1 = a\sin\left(1 - \frac{\lambda}{p}\right), \tag{3}$$

The second FOV angle of incidence $\alpha_2$, corresponding to the left-most incident ray 111a in FIG. 2A, may be defined by a limitation on a maximum angle $\beta_{max}$ of the in-coupled light:

$$\alpha_2 = a\sin\left(n \cdot \sin(\beta_{max}) - \frac{\lambda}{p}\right), \tag{4}$$

The width $w = |\alpha_1 - \alpha_2|$ of the input 1D FOV of the waveguide 210 at a particular wavelength can be estimated from equations (3) and (4). Generally the input FOV of a waveguide increases as the refractive index of the waveguide increases relative to that of the surrounding media. By way of example, for a substrate of index n surrounded by air and for $\beta_{max}=75°$, $\lambda/p=1.3$, the width w of the input 1D FOV of the waveguide for monochromatic light may be about 26° for n=1.5, about 43° for n=1.8, and about 107° for n=2.4.

As can be seen from equations (3) and (4), the input FOV 234 of waveguide 210 is a function of the wavelength $\lambda$ of input light, so that the input FOV 234 shifts its position in the angle space as the wavelength changes; for example, it shifts towards the out-coupler 240 as the wavelength increases. Thus it can be challenging to provide a sufficiently wide FOV for polychromatic image light with a single waveguide.

Figure 3:
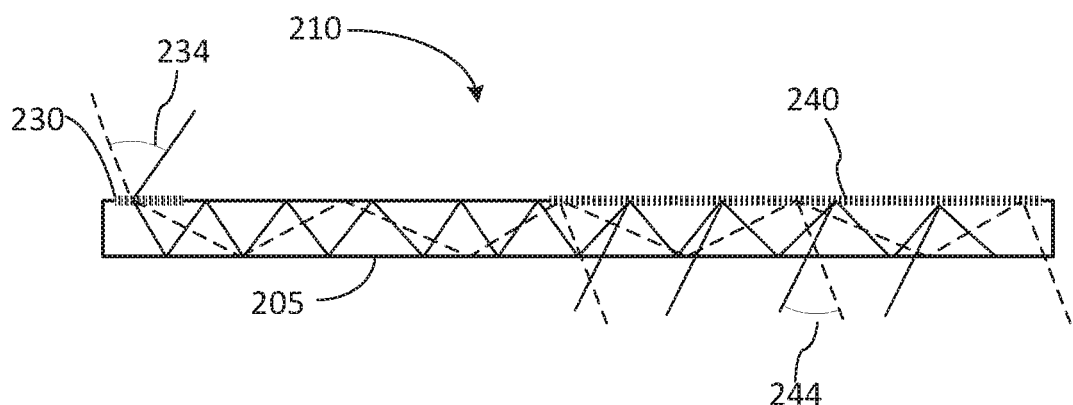
FIG. 3 is a schematic diagram illustrating input and output FOVs of a display waveguide for a selected color channel.

Referring to FIG. 3, light coupled into the waveguide 210 by the in-coupler 230 propagates in the waveguide toward the out-coupler 240. The out-coupler 240 is configured to re-direct at least a portion of the in-coupled light out of the waveguide 210 at an angle or angles within an output FOV 244 of the waveguide, which is defined in part by the out-coupler 240. An overall FOV of the waveguide, i.e. the range of incidence angles $\alpha$ that may be conveyed to the viewer by the waveguide, may be affected by both the in-coupler 230 and the out-coupler 240.

In some embodiments the gratings embodying the in-coupler 230 and the out-coupler 240 may be configured so that the vector sum of their grating vectors $g_i$ is equal to substantially zero:

$$|\Sigma g_i| \approx 0. \tag{5}$$

Here the summation in the left hand side (LHS) of equation (5) is performed over grating vectors $g_i$ of all gratings that cooperate to diffract the input light traversing the waveguide, including the one or more gratings of the in-coupler 230, and the one or more gratings of the out-coupler 240. A grating vector $g_i$ is a vector that is directed normally to the equal-phase planes of the grating, i.e. its "grooves", and whose magnitude is inversely proportional to the grating pitch p, $|g_i|=2\pi/p$. Under conditions of equation (5), rays of the image light exit the waveguide by means of the out-coupler 240 at the same angle at which they entered the in-coupler 230, provided that the waveguide 210 is an ideal slab waveguide with parallel outer faces 211, 212, and the FOV of the waveguide is defined by its input FOV. In practical implementations the equation (5) will hold with some accuracy, within an error threshold that may be allowed for a particular display system. In an example embodiment with a single 1D input grating and a 1D output grating, the grating pitch of the out-coupler 240 may be substantially equal to the grating pitch of the in-coupler 230.

Figure 4:
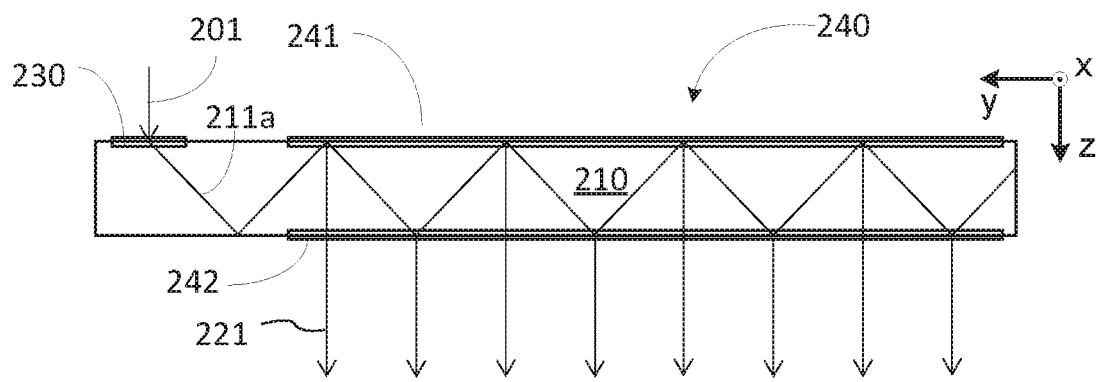
FIG. 4 is a schematic side cross-section of a display waveguide with two out-coupler gratings at main outer faces.

FIG. 4 illustrates an embodiment in which the out-coupler 240 includes two diffraction gratings 241, 242, which may be disposed for example at main outer faces of the waveguide. The diffraction gratings 241 and 242 may be configured so that the in-coupled light 211a exits the waveguide as output light 221 after being sequentially diffracted once by each of these gratings. In some embodiments, the grating vectors $g_1$ and $g_2$ of the diffraction gratings 241, 242 may be directed at an angle to each other. In at least some embodiments they may be selected so that $(g_0+g_1+g_2)=0$, where $g_0$ is the grating vector of the in-coupler 230.

Figure 5:
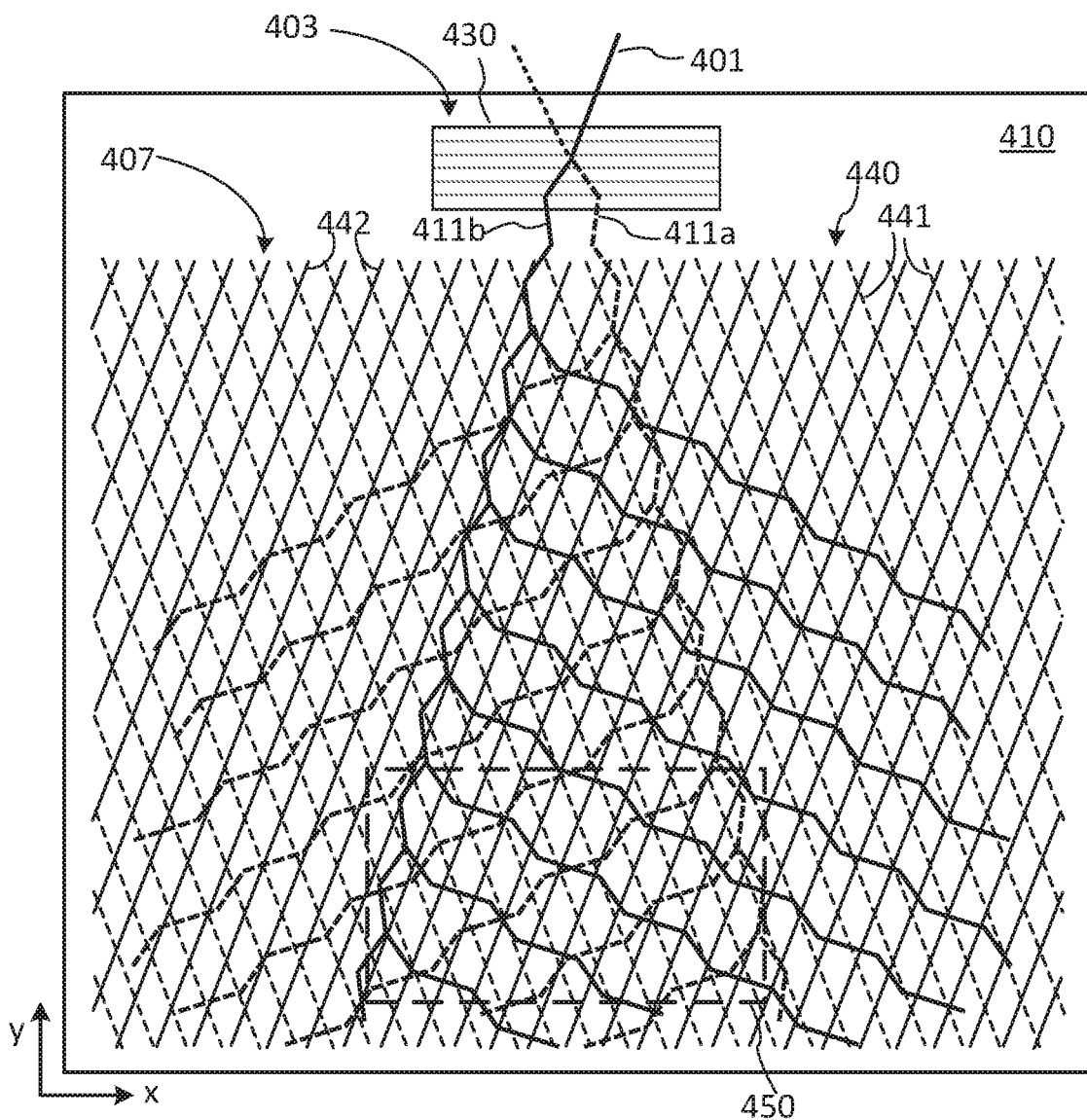
FIG. 5 is a schematic plan view of a pupil-expanding waveguide illustrating an example layout of output-coupler gratings and an in-coupler aligned therewith.

FIG. 5 illustrates, in a plan view, a display waveguide 410 with an in-coupler 430 disposed in an input area 403 of the waveguide, and an out-coupler 440 disposed in an output area 407 of the waveguide. The in-coupler 430 may be in the form of an input diffraction grating with a grating vector $g_0$ directed generally toward the out-coupler 440. The out-coupler 440 is comprised of two output linear diffraction gratings 441 and 442 with grating vectors $g_1$ and $g_2$ oriented at an angle to each other. In some embodiments gratings 441 and 442 may be linear diffraction gratings formed at main outer faces of the waveguide. In some embodiments they may be superimposed upon each other at either face of the waveguide, or in the volume thereof, to form a 2D grating. Light 401 incident upon the in-coupler 430 within a FOV of the waveguide may be coupled by the in-coupler 430 into the waveguide to propagate toward the out-coupler 440, expanding in size in the plane of the waveguide, as illustrated by in-coupled rays 411a and 411b. The gratings 441, 442 are configured so that consecutive diffractions off each of them re-directs the in-coupled light out of the waveguide. Rays 411a may be rays of in-coupled light that, upon entering the output area 407 of the waveguide where the out-coupler 440 is located, are first diffracted by the first grating 441, and then are diffracted out of the waveguide by the second grating 442 after propagating some distance within the waveguide. Rays 411b may be rays of the in-coupled light that are first diffracted by the second grating 442, and then are diffracted out of the waveguide by the first grating 441. An exit pupil 450 of the waveguide, which may also be referred to as the eyebox projection area 450, is indicated where the out-coupled light has optimal characteristics for viewing, for example where it has desired dimensions. The exit pupil 450 may be located at some distance from the in-coupler 430.

Figure 6A:
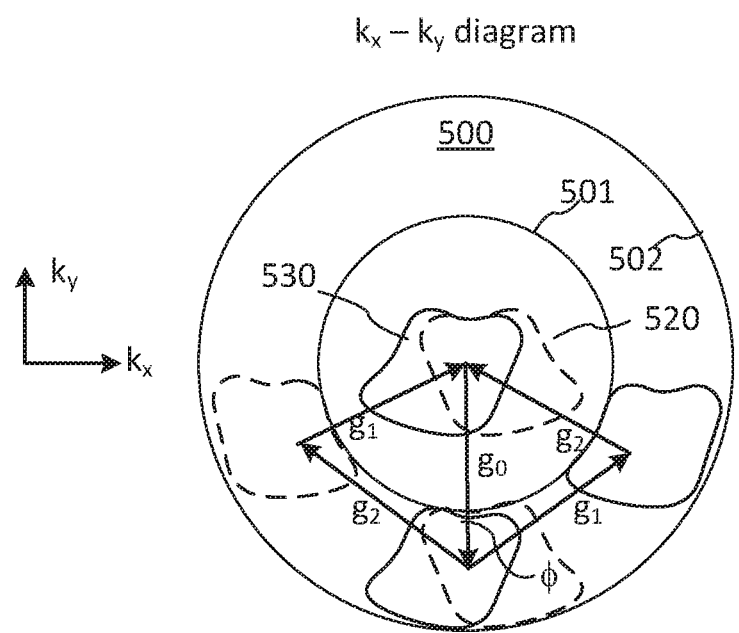
FIG. 6A is a schematic k-space diagram illustrating the formation of a 2D FOV in an example embodiment of the waveguide of FIG. 5.

FIG. 6A illustrates aspects of operation of the display waveguide 410 with reference to a $(K_x, K_y)$ plane, where $K_x$ and $K_y$ denote x and y coordinates of a projection of a normalized k-vector $K=k\cdot 2\pi/\lambda$ of the image light upon the plane of the waveguide:

$$K_x = n\sin(\theta_x), \text{ and } K_y = n\sin(\theta_y). \tag{6}$$

Here n is the refractive index of the substrate where in-coupled light is propagating, and the angles $\theta_x$ and $\eta_y$ define the direction of light propagation in the plane of the waveguide (x,y) in projection on the x-axis and y-axis, respectively. These angles may also represent the coordinates of angle space in which a 2D FOV of the waveguide may be defined. The $(K_x, K_y)$ plane may be referred to herein as the K-space, and the normalized wavevector $K=(K_x, K_y)$ as the in-plane K-vector or simply as the K-vector.

In the K-space, the in-coupled light may be graphically represented by a TIR ring 500. The TIR ring 500 is an area of the K-space bounded by a TIR circle 501 and a maximum-angle circle 502, both circles centered at $K_0=(0, 0)$ corresponding to the normal incidence upon the waveguide. The TIR circle 501 corresponds to the TIR angle $\beta_c$. The maximum-angle circle 502 corresponds to a maximum propagation angle $\beta_{max}$ for in-coupled light. States within the TIR circle 501 represent uncoupled light, i.e. the in-coming light that is incident upon the in-coupler 430, or the light coupled out of the waveguide by the out-coupler gratings 441 and/or 442. With the normalization, the radius $r_{TIR}$ of the TIR circle 501 and the radius $r_{max}$ of the outer circle 502 may be defined by the following equations:

$$r_{TIR}=1, r_{max}=n \cdot \sin(\beta_{max}) \quad (7)$$

The greater the refractive index n, the wider is the TIR ring 500 and the broader is the angular range of input light of a wavelength λ that can be coupled into the waveguide.

Arrows labeled $g_0$, $g_1$, and $g_2$ in FIG. 6A represent the normalized grating vectors of the in-coupler 430, the first out-coupler grating 441, and the second out-coupler grating 442, respectively, for a particular wavelength λ, with grating lengths $g_i=\lambda/p_i$, where $p_i$ is the pitch of i-th grating, i=0, 1, or 2. In the figure these grating vectors form two closed triangles describing two possible paths in the K-space along which the incoming light may return to the same K-space state after being diffracted once by each of the three gratings, thereby preserving the direction of propagation in the angle space from the input to the output of the waveguide. Each diffraction may be represented as a shift in the ($K_x$, $K_y$) plane by a corresponding grating vector. Areas 520, 530 in combination represent the FOV of the waveguide in the ($K_x$, $K_y$) plane, and may be referred to as the first and second partial FOV areas, respectively. They are defined by the in-coupler and out-coupler gratings and the refractive index of the waveguide, and represent all k-vectors of light that stays trapped within the waveguide (the TIR ring 500) after consecutive diffractions upon the input grating 430 and one of the output gratings 441, 442, and returns to a same ($K_x$,$K_y$) location in the interior of the TIR circle 501 after a subsequent diffraction upon the other of the two output gratings. The first partial FOV area 520 may be determined by identifying all ($K_x$, $K_y$) states which are imaged to itself by consecutive diffractions upon the input grating 430, the first output grating 441, and the second output grating 442, each of which may be represented as a shift in the ($K_x$, $K_y$) plane by a corresponding grating vector. The second partial FOV area 530 may be determined by identifying all ($K_x$, $K_y$) states which are imaged to itself by consecutive diffractions upon the input grating 430, the second output grating 442, and the first output grating 441.

Figure 6B:
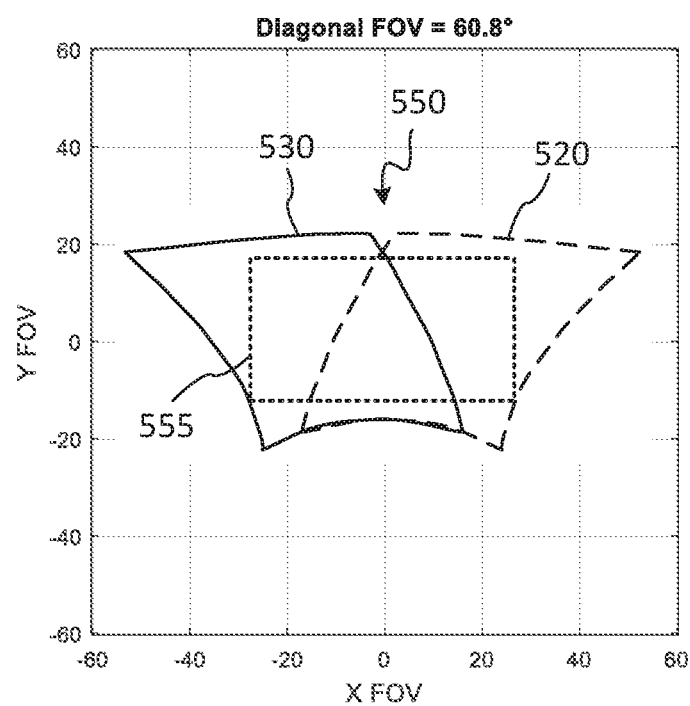
FIG. 6B is a graph illustrating the 2D FOV of the waveguide of FIG. 6A in the angle space.

FIG. 6B illustrates the first and second partial FOVs 520, 530 in a 2D angle space, with the horizontal and vertical axes representing the angles of incidence $\theta_x$ and $\theta_y$ of input light in the x-axis and y-axis directions, respectively, both in degrees. The (0,0) point corresponds to normal incidence upon the in-coupler. In combination, partial FOVs 520, 530 define a full FOV 550 of the waveguide at the wavelength λ, which encompasses all incident rays of input light of the selected color or wavelength that may be conveyed to a user. A rectangular area 555 which fits within the full FOV 550 may define a monochromatic FOV of the waveguide that may be useful in a display.

The position, size, and shape of each partial FOV 520, 530 in the angle space, and thus the full 2D FOV of the waveguide, depends on the wavelength λ of the input light, on the ratios of pitches $p_0$, $p_1$, and $p_2$ of the input and output gratings to the wavelength of incoming light λ, and on the relative orientation of the gratings. Thus, the 2D FOV of the waveguide may be suitably shaped and positioned in the angle space for a particular color channel or channels by selecting the pitch sizes and the relative orientation of the gratings. In some embodiments of waveguide 410, the output gratings 441, 442 may have the same pitch, $p_1=p_2$ and be symmetrically oriented relative to the input grating. In such embodiments the grating vectors $g_1$, $g_2$ of the first and second output gratings may be oriented at angles of +\-ϕ relative to the grating vector $g_0$ of the in-coupler. By way of non-limiting example, the grating orientation angle ϕ may be in the range of 50 to 70 degrees, for example 60 to 66 degrees, and may depend on the refractive index of the waveguide. FIG. 6B illustrates the FOV of an example waveguide with the refractive index n=1.8, ϕ≅60°, and $p_1=p_2=p_3=p$, with p/λ selected to center the FOV 555 at normal incidence.

In some embodiments, a single waveguide formed of an optically transparent high-index substrate may be used in a display system to convey multiple color channels of RGB light from an image source to a viewing area of a waveguide display, such as an eyebox of an NED. In some embodiments the same input and output gratings may be used for at least two color channels of the image light, for example for at least two of the Red, Green, and Blue RGB color channels, or for all three RGB color channels. The desirability of having a high refractive index n may be understood by noting that in the wavelength-normalized K-space the length of each grating vector scales with the wavelength, i.e. $g_i=\lambda/p_i$, where $p_i$ is the pitch of the i-th grating, i=0, 1, or 2. As the width of the TIR ring 500 is proportional to the refractive index n, greater values of the refractive index enable broader polychromatic FOV, i.e. the common FOV that is shared by two or more color channels of the image light.

Figure 7:
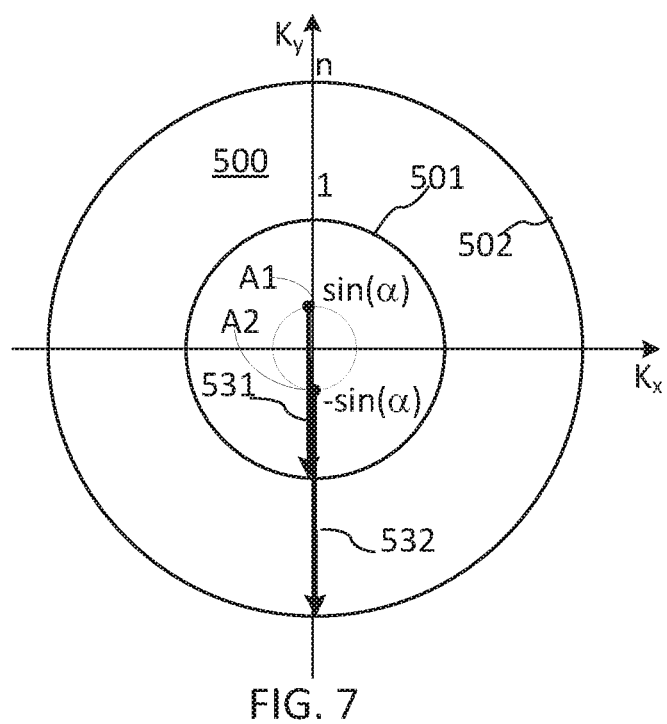
FIG. 7 is a normalized K-space diagram illustrating an estimation of a symmetric 1D FOV shared by two different color channels for a display waveguide of FIG. 5.

FIG. 7 illustrates the wavelength-scaled grating vectors 531, 532 of the in-coupler 430 for two different wavelength $\lambda_1$ and $\lambda_2 > \lambda_1$ in the K-space diagram of FIG. 6A. In the illustrated example the grating vector of the in-coupler is directed along the y-axis. The normalized grating vector 531 for the first wavelength $\lambda_1$ has a length $\lambda_1/p_0$, while the longer normalized grating vector 532 has a length of $\lambda_2/p_0$. The first wavelength $\lambda_1$ may be, for example, a peak wavelength of the blue color channel, while the second wavelength $\lambda_2$ may be, for example, a peak wavelength of the red color channel.

In some embodiments a maximum y-axis width (2α) of a symmetrical FOV shared by the two wavelengths, $FOV_y=(-\alpha,+\alpha)$, may be estimated from equations (8) and (9).

$$1+\sin(\alpha)=\lambda_1/p_0 \quad (8)$$

$$n \cdot \sin(\beta_{max})-\sin(\alpha)=\lambda_2/p_0 \quad (9)$$

Equation (8) represents a condition that the shorter of the grating vectors 531, 532 is long enough to reach the TIR circle 501 from a state A1 of the FOV that is farthest from the TIR circle 501 in the direction of the grating vector. Equation (9) represents a condition that a K-state A2 at an opposite end of the FOV is far enough from the outer boundary 502 of the TIR ring 500 that the longer of the two grating vectors 531, 532 doesn't extend beyond it. These conditions provide an estimate for the pitch $p_0$ of the in-coupler grating (equation (10)) and an estimate of the corresponding half-width α of the common FOV of the two wavelengths along the y-axis (equation 11):

$$p_0 = \frac{\lambda_2 + \lambda_1}{n \cdot \sin(\beta_{max}) + 1} \quad (10)$$

$$\alpha = a\sin\left(\frac{\lambda_1 \cdot n \cdot \sin(\beta_{max}) - \lambda_2}{\lambda_2 + \lambda_1}\right) \quad (11)$$

An estimated width $2\alpha$ of the shared 1D FOV for wavelengths $\lambda_1$ and $\lambda_2$ increases as the refractive index n of the waveguide increases above a minimum value $n_{min}$, which in some embodiments may be estimated as $n_{min}=\lambda_2/\lambda_1 \sin(\beta_{max})$. By way of example the longer wavelength $\lambda_2$ may correspond to red light, with the wavelength e.g. of 635 nm, while the shorter wavelength $\lambda_1$ may correspond to blue light, with the wavelength e.g. of 465 nm, resulting in a minimal value of n of about 1.4 for a waveguide configured to transmit all three color channels of RGB light. According to Equation (11), in one embodiment an estimated width $2\alpha$ of a symmetrical 1D FOV of a single one-layer waveguide that may be shared by all three channels of RGB light may be about 30 degrees for n=2.0, about 40 degrees for n=2.2, and about 63 degrees for n=2.6.

Equation (11) provides an estimate of a 1D FOV that is centered at normal incidence and may be supported by a single waveguide for polychromatic light with wavelengths from $\lambda_1$ to $\lambda_2$. A 2D FOV that the waveguide supports for polychromatic light at its output, e.g. at the eyebox, may further depend on the out-coupler, such as the number and configuration of the output gratings.

In some embodiments, a single waveguide made of optically transparent high-index material with the refractive index of about 2.3, or preferably 2.4 or greater may be used in a display system to convey RGB light from an image source to an eyebox of a NED. In some embodiments, a NED may transmit image light with a single waveguide made of optically transparent high-index material with the refractive index of at least 2.5. In some embodiments, a NED may transmit image light with a single waveguide made of optically transparent high-index material with the refractive index of at least 2.6.

Figure 8:
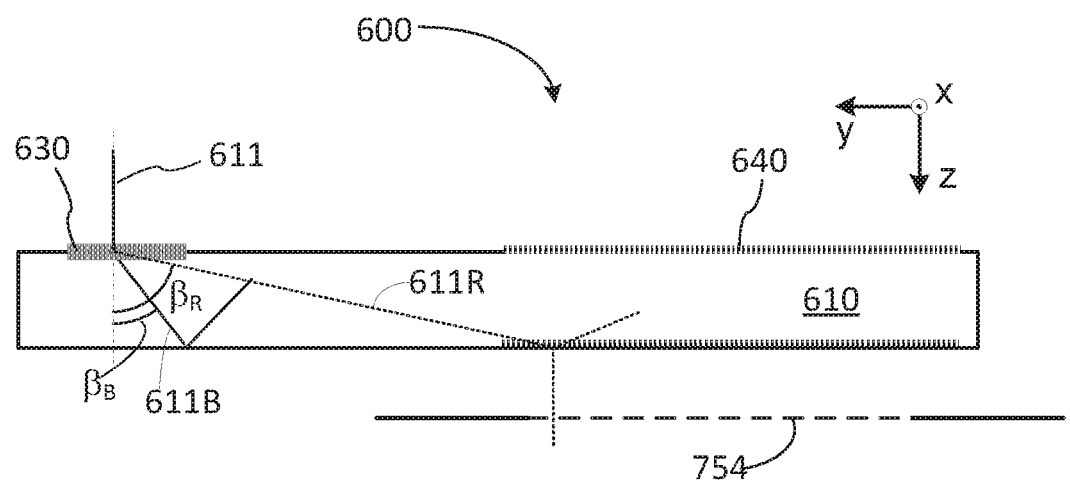
FIG. 8 is a schematic side cross-sectional view of a display waveguide illustrating the divergence of two different color channels therein.

Referring now to FIG. 8, rays of different color channels coupled into a waveguide by a same grating will propagate in the waveguide at different angles, with the difference the greater the bigger is the spectral distance between the color channel. FIG. 8 schematically illustrates the propagation of ray 611B of a blue color channel and ray 611R of a red color channel of input RGB light 611 in a display waveguide 600. The display waveguide 600 may be formed of a waveguide body 610 such as a high-index substrate, an input coupler 630, and an output coupler 640. The input coupler 630 and the output coupler 640 may be for example as described above with reference to couplers 230, 240 of FIGS. 3, 4 or couplers 430, 440 of FIG. 5. In the illustrated embodiment the input coupler 630 is in the form of a diffraction grating of a pitch $p_0$. Diffraction on this grating disperses the incident RGB light 611 according to the wavelength. As a result, ray 611R of the red color channel may propagate in the substrate 610 at a significantly greater angle $\beta_R$ than the propagation angle $\beta_B$ of ray 611B of the blue color channel. This divergence of color channels in the substrate 610 of the display waveguide 600 may necessitate a more complex design of the out-coupler 640. Indeed, ray 611B propagating at a smaller angle may experience a greater number of bounces off the outer faces of the waveguide than the ray 611R that propagates at a greater angle. In embodiments where the output gratings are formed at the outer faces of the waveguide, ray 611B will also experience a greater number of interactions with the output gratings. A similar or even greater discrepancy in the grating-ray interactions arises for image rays of a same wavelength at the edges of the input FOV, such as rays 111a and 111b shown in FIG. 2. Therefore, maintaining color and brightness uniformity across the FOV may require output gratings with a strong angular dependence of the grating efficiency. The gratings may have to be specifically designed to compensate for the difference in the number of waveguide "bounces", or ray-grating interactions, per unit length of the output area of the waveguide for image rays of different colors and/or different angles of incidence. This may significantly complicate the grating design.

Figure 9A:
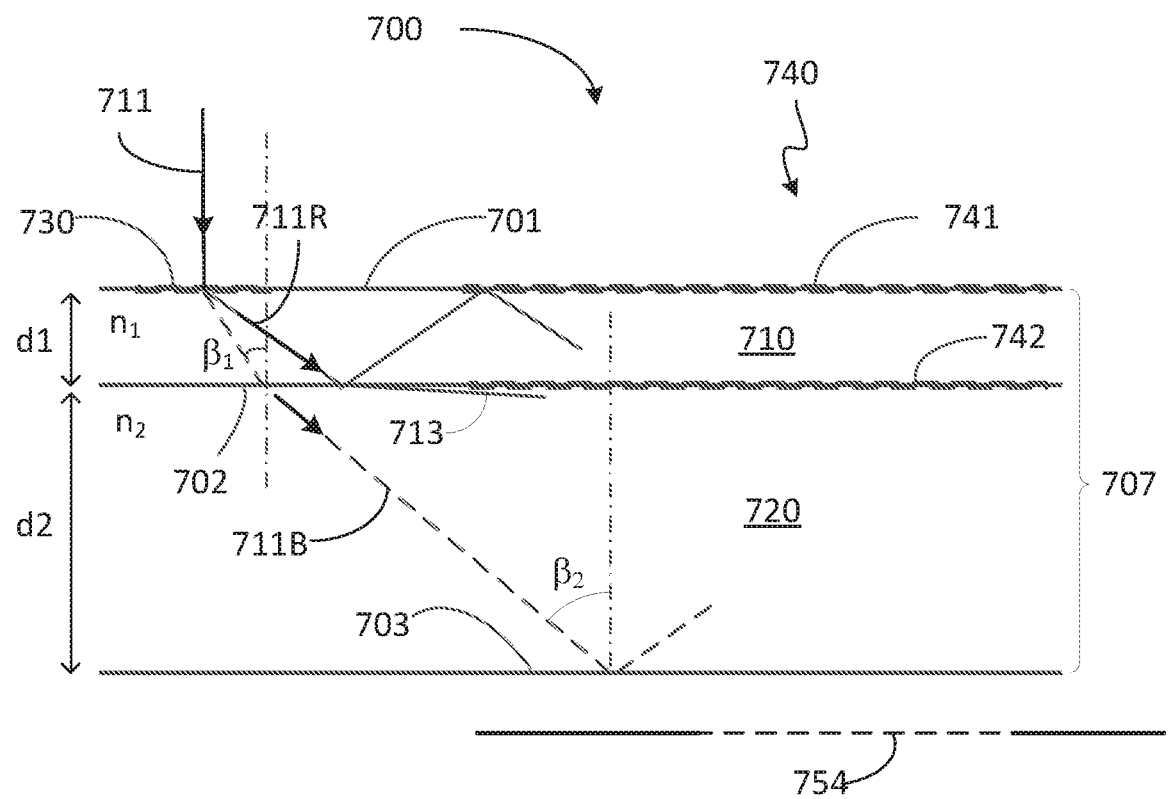
FIG. 9A is a schematic side cross-sectional view of a display waveguide having a top high-index layer illustrating the coupling of different color channels in to the waveguide.

Referring to FIG. 9A, there is illustrated an example two-layer display waveguide 700 according to an embodiment of the present disclosure. The display waveguide 700 addresses the angle difference issue by directing at least a portion of the longer-wavelength color channel to propagate in a higher-index material. The two-layer display waveguide 700, which may be referred to hereinafter simply as waveguide 700, may be an embodiment of waveguide 120 or waveguide 410 described above. It has a waveguide body 707 that includes a high-index (HI) layer 710 supported by a substrate 720, which may have a relatively lower index of refraction. The HI layer 710 may also be referred to herein as the top layer 710. The substrate 720 plays the role of a second, or lower, layer of the two-layer waveguide 700. Both the HI layer 710 and the substrate 720 may be made of optically transparent materials having suitably low absorption coefficients. The HI layer 710 may be disposed over the substrate 720 without an airgap between them to form a contiguous waveguide body. The term "high-index layer" as used herein may refer to a layer with a refractive index $n_1$ that is greater than the refractive index $n_2$ of the substrate 720, $n_1 > n_2$. In one embodiment, nz may be in the range of 1.5 to 2.0, and $n_1$ may be in the range of 2.2 to 2.6 or greater, with the upper limit that may be defined by availability of suitable materials. The difference $\Delta n = (n_1 - n_2)$ between the refractive indices of the layers may be greater than 0.3 in at least some embodiments. In some embodiments the index difference $\Delta n$ may be in the range from 0.3 to 1. In some embodiments $\Delta n$ may be greater than 0.4. In some embodiments $\Delta n$ may be greater than 0.5.

Examples of possible material that may be used for the HI layer 710 include LiNbO3, TiO2, GaN, AlN, SiC, CVD diamond, ZnS. The thickness of the HI layer 710 and the substrate 720 may vary depending on their indices and/or design goals. By way of non-limiting example, the thickness $d_1$ of the HI layer 710 may be in the range of 150 to 400 μm, for example about 300 μm. The substrate thickness $d_2$ may be, for example, between 200 and 600 μm. Embodiments with the layer and substrate thickness outside of these ranges may also be envisioned.

Figure 9B:
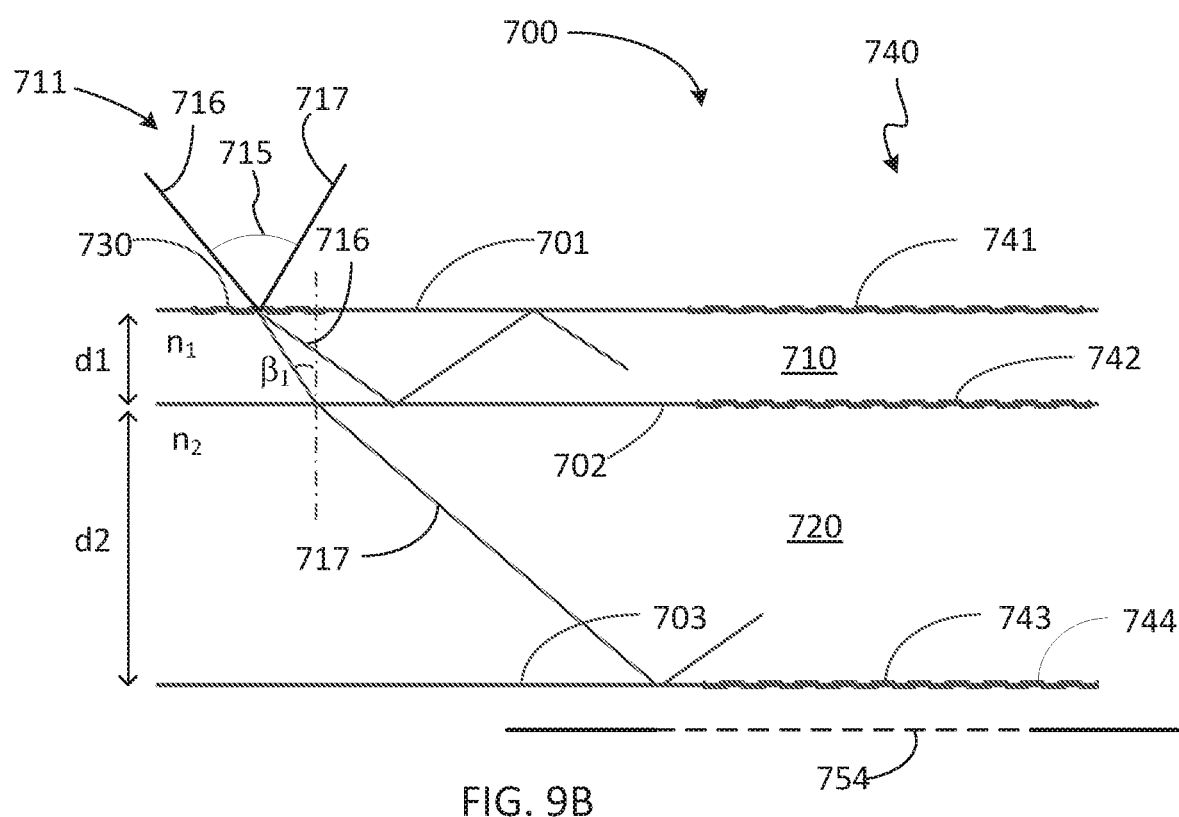
FIG. 9B is a schematic side cross-sectional view of the display waveguide of FIG. 9A illustrating example propagation trajectories in the waveguide of in-coupled rays of a selected wavelength in dependence on the angle of incidence upon the waveguide.

Continuing to refer to FIG. 9A, waveguide 700 may include an in-coupler 730 for coupling image light 711 into the waveguide, and out-coupler 740 for coupling in-coupled image light out of the waveguide toward an eyebox 754. In one embodiment the in-coupler 730 may be in the form of, or include, an input grating. In one embodiment the in-coupler 730 may be in the form of, or include, a prism. An input grating implementing the in-coupler 730 may be disposed so as to inject light directly into the HI layer 710, and may be disposed in or upon the HI layer 710. In some embodiments an input grating may also be formed at an interface 702 between the HI layer 710 and substrate 720. In some embodiments more than one input grating may be provided. For example, in embodiments with two or more input gratings, at least one such grating may be disposed in the HI layer 710 or at a surface thereof. The out-coupler 740 may be laterally offset from the in-coupler 730, for example along the y-axis in the direction of the grating vector of the in-coupler. The out-coupler 740 may be in the form of two or more diffraction gratings, at least some of which configured to diffract light propagating in the HI layer 710. In one embodiment the out-coupler 740 may include a first grating 741, which may be disposed at a surface 701 of the HI layer 710, and a second grating 742, which may be disposed at the interface 702 between the substrate 720 and the HI layer 710. In some embodiments one or both of these gratings 741, 742 may be disposed within the HI layer 710. In some embodiments a pair of optional output gratings 743, 744 may be disposed within the substrate 720 and/or at a surface thereof, as illustrated in FIG. 9B. The surfaces 701, 703 may define two main outer faces of the waveguide body, which bound the in-coupled image light within the waveguide body by TIR as it propagates from the in-coupler to the out-coupler, and through which image light may enter and/or exits the waveguide.

Image light 711 may include a first color channel and a second color channel, with the second color channel comprising longer wavelengths than the first color channel. The first color channel may be indicated with a letter "B" and referred to as the blue color channel or blue light, and the second color channel may be indicated with a letter "R" and referred to as the red color channel or the red light. In some embodiments the first color channel and the second color channel may correspond to the "B" and "R" color channels of RGB light. The HI layer 710 may be configured to trap at least a portion of the red color channel of image light 711 by means of TIR at the interface 702 with substrate 720, while allowing the blue color channel of the image light to propagate into the substrate 720, where it can be trapped by TIR at the second outer surface 703 thereof. This is schematically illustrated by ray 711R of the red color channel of image light 711 being trapped in the HI layer 710, and ray 711B of the blue color channel of image light 711 propagating into the substrate 720 and experiencing TIR at the surface 703 thereof. Due to the higher refractive index of HI layer 710 relative to substrate 720, the propagation angle $\beta_1$ of the red ray 711R in the HI layer 710 and the propagation angle of the blue ray 711B within substrate 720 may be substantially closer to each other than their propagation angles in the HI layer 710 or the propagation angles of rays 611R and 611B in the waveguide 600 of FIG. 8. In some embodiments the thickness $d_1$ of layer 710 and the thickness $d_2$ of substrate 720 may be selected so as to substantially equalize the number of bounces that red ray 711R and blue ray 711B experience on their way to the out-coupler 740. In some embodiments the thickness $d_1$ of layer 710 and the thickness $d_2$ of substrate 720 may be selected so as to substantially equalize the number of interactions with the out-coupler gratings 741, 742 that the red ray 711R and the blue ray 711B experience when propagating in the output area of the waveguide's body where the out-coupler 740 is disposed.

The coupling of image light 711 of wavelength λ in the HI layer 710 by the input grating 730 may be described using equation (1) with $n=n_1$ and $p=p_0$, where $p_0$ is the pitch of the input grating 730. A TIR condition on the interface 702 may be expressed as $$n_1 \sin(\beta_1) \geq n_2 \quad (12)$$

From equations (1) and (12), a first specific angle of incidence $\alpha_{12}$ of image light 711 upon the input grating 730, i.e. the angle of incidence at which the image light of wavelength λ experiences TIR at interface 702 may be estimated from the following equation (13):

$$\sin(\alpha_{12}) = n_2 - \frac{\lambda}{p_0} \quad (13)$$

Rays of image light 711 that are incident upon the waveguide at smaller angles, $\alpha<\alpha_{12}$, may propagate into the substrate 720 and may experience TIR at the outer surface 703 thereof. Rays incident at a slightly greater angle than $\alpha_{12}$ will be partially reflected back into the HI layer 710 and partially propagate into the substrate 720 at a "glancing" angle as illustrated at 713, with the reflected fraction the greater the closer to the TIR condition at the interface 702, and the transmitted fraction vanishing at the TIR condition.

A second specific angle of incidence $\alpha_{23}$ upon waveguide 700, i.e. the smallest angle of incidence for which the image light of wavelength λ experiences TIR at the outer surface 703, may be estimated from the following equation (14):

$$\sin(\alpha_{23}) = 1 - \frac{\lambda}{p_0} \quad (14)$$

A limitation on a maximum propagation angle $\beta_{2max}$ of the in-coupled light in substrate 720 yields a third specific angle of incidence $\alpha_3$, which may be estimated from the following equation (15):

$$\sin(\alpha_3) = n_2 \cdot \sin(\beta_{max}) - \frac{\lambda}{p_0}, \quad (15)$$

A limitation on a maximum propagation angle $\beta_{1max}$ of the light trapped in the HI layer 710 yields a fourth specific angle of incidence $\alpha_4$, which may be estimated from the following equation (16):

$$\sin(\alpha_4) = n_1 \cdot \sin(\beta_{max}) - \frac{\lambda}{p_0}, \quad (16)$$

FIG. 9B illustrates the propagation of example rays 716 and 717 of image light 711 of a wavelength λ in the multi-layer waveguide 700. Rays 716 and 717 may be received from the opposite edges of an input FOV 715 of the waveguide. The input FOV 715 defines, for a particular plane of incidence, the angular range of incidence for which image light 711 may be coupled into the waveguide 700 by the input grating 730. Image light received from a portion of the input FOV 715 that corresponds to relatively greater propagation angles $\beta_1>\alpha_{12}$ in the HI layer 710, as exemplified by ray 716, may be trapped in that layer, and propagate toward the out-coupler 740 guided by TIR at the top outer surface 701 and the interface 702. Image light of the same wavelength received from the rest of the input FOV 715, as exemplified by the second ray 717, may at least partially pass through the interface 702 into substrate 720 and propagate toward the out-coupler 740 guided at least partially by TIR at the outer surfaces 701, 703 of the waveguide. By confining image light received from a portion of the FOV 715 in a high-index region or portion of the waveguide's thickness, such as the HI layer 710, the discrepancy in the grating-light interactions between different portions of the FOV may be advantageously reduced.

Figure 10:
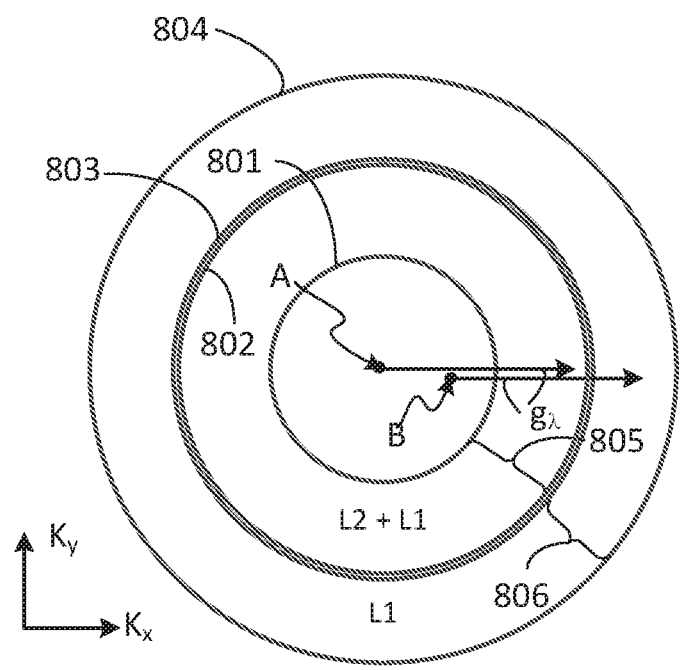
FIG. 10 is a K-space diagram illustrating the coupling of a wavelength of image light into the two-layer display waveguide of FIGS. 9A and 9B.

FIG. 10 shows a K-state diagram illustrating the operation of an example embodiment of waveguide 700 in the normalized K-space ($K_x$, $K_y$). Similarly to diagrams of FIGS. 6A and 7, the interior of a first TIR circle 801 represents the in-plane K-vectors of uncoupled light. The interior of a first TIR ring 805 represents in-coupled light that at least partially passes the layer-substrate interface 702 and experiences TIR at the outer surface 703 of substrate 720. The first TIR ring 805 is bounded by the first TIR circle 801 of radius $r_1=1$ and a first maximum-angle circle 802 of radius $r_2=n_2 \cdot \sin(\beta_{2max})$. The interior of a second TIR ring 806 represents in-coupled light that is trapped in the HI layer 710 and experiences TIR at the interface 702 with substrate 720, with the angle of incidence upon it less than $\beta_{1max}$, i.e. excluding "glancing" rays in the HI layer 710. The second TIR ring 806 is bounded by a second TIR circle 803 of radius $r_3=n_2$ and a second maximum-angle circle 804 of radius $r_4=n_1 \cdot \sin(\beta_{1max})$. The in-coupler 730 is represented by the wavelength-scaled grating vector $g_\lambda$ of length $g_\lambda=\lambda/p_0$ that couples an uncoupled K-state inside the first TIR circle 801 to a coupled K-state shifted by the grating vector $g_{80}$.

In FIG. 10, the operation of waveguide 700 for a selected wavelength $\lambda$ is illustrated by way of example with reference to two different K-states of incident light. State "A" in the center (0,0) of the K-space corresponds to a normal incidence of the image light upon the waveguide. State "B" corresponds to image light with a non-zero angle of incidence $\alpha_B$ upon the waveguide, $0<\alpha_B<90$; state "B" lies at a distance $d_B=|\sin(\alpha_B)|$ from the K-space center (0,0). In the illustrated example, the in-coupler 730 transfers state "A" into a state within the first TIR ring 805, and transfers state "B" into a state within the second TIR ring 806. Hence normally incident light of wavelength $\lambda$ will at least partially pass through the interface 702 and bounce off the substrate's outer surface 703 by TIR. Image light of the same wavelength that is incident upon the waveguide at angle $\alpha_B$, which in the absence of the HI layer 710 would pass through the waveguide without being coupled, will be trapped within the HI layer 710. Thus, the addition of the HI layer 710 expands the k-space of in-coupled light, thereby broadening the FOV that waveguide 700 is able to support.

Figure 11:
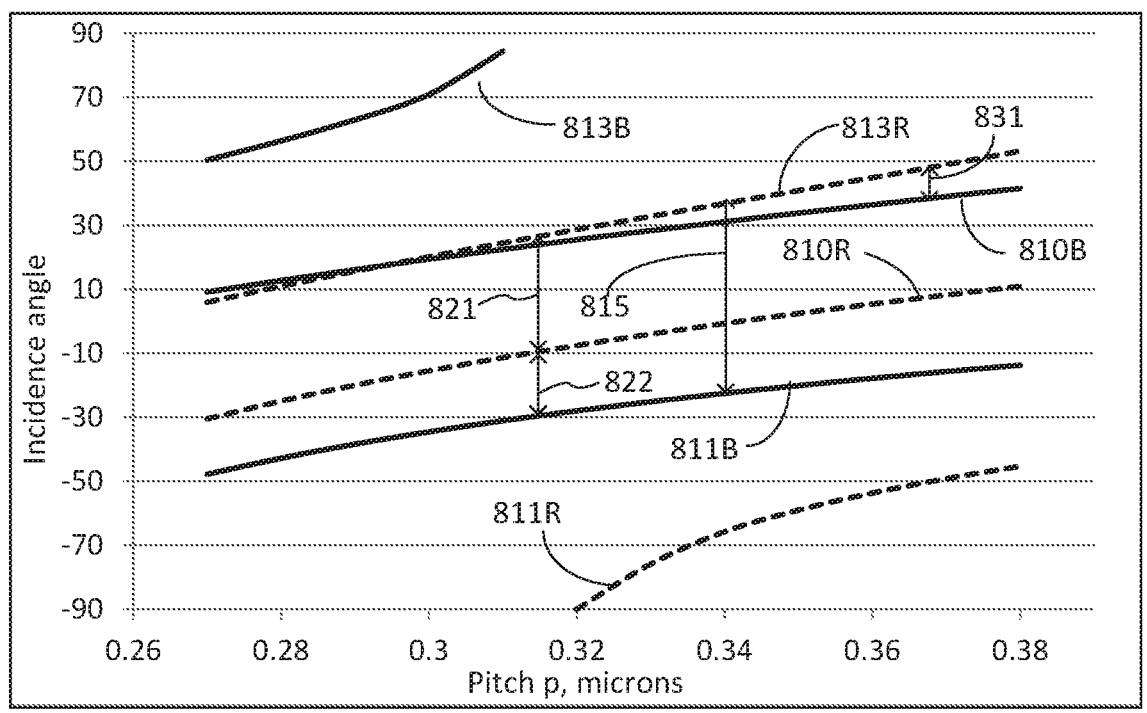
FIG. 11 is a graph illustrating critical angles of incidence for in-coupling of red and blue wavelengths into the two-layer waveguide of FIGS. 9A and 9B in dependence on the pitch of the input grating.

FIG. 11 illustrates by way of example the specific angles of incidence estimated from equations (13), (14), and (16) for wavelengths of the red and blue color channels in dependence on the pitch p of the in-coupler grating. An embodiment of waveguide 700 with $n_1=2.6$ and $n_2=1.9$ is assumed. Wavelengths $\lambda_R=640$ nm and $\lambda_B=465$ nm are assumed for the red and blue color channels, respectively. Solid lines relate to the blue color channel, dotted lines relate to the red color channel. The first specific angle of incidence corresponding to the onset of TIR at the HI layer-substrate interface 702 is shown at 810R for the Red color channel and at 810B for the blue color channel. The second specific angle of incidence corresponding to the onset of TIR at the outer surface 703 is shown at 811R for the Red color channel and at 811B for the blue color channel. The third specific angle of incidence defined by the limitation on the maximum propagation angle $\beta_{1max}$ in the HI layer is shown at 813R for the Red color channel and at 813B for the blue color channel. For each color channel, curves 811$x$ and 813$x$ bound the range of incidence angles that can be coupled into the waveguide, while curves 810$x$ and 813$x$ bound the range of incidence angles that can be trapped in the HI layer of the waveguide; here "x" stands for either "R" or "B". Curves 811B and 813R bound the range 815 of incidence angles that can be coupled into the waveguide for both the red and blue wavelengths, thereby defining the width $\Theta$ of the input 1D FOV of the waveguide for RGB light. In the illustrated example, light of the red color channel may be trapped within the HI layer 710 if received in a first portion 821 of the input 1D FOV 815, and may propagate part of the time in the substrate 720 if received in a second, smaller portion 822 of the input 1D FOV 815. In this example, for embodiments with p smaller than about 300 nm no in-coupled light of the blue wavelength is trapped in the HI layer 710 by TIR. In embodiments with p greater than about 300 nm, light of the blue wavelength received in a small portion 831 of the input FOV 815 may be trapped in the HI layer 710. In embodiments with smaller refractive index $n_2$ of the substrate, propagation in the HI layer 710 may support a greater portion of the 1D FOV for both the red and blue color channels. In embodiments with a smaller refractive index $n_1$ of the HI layer 710, a greater portion of the 1D FOV for both the red and blue color channels may be supported by propagation in the substrate 720. For the green color channel, the fraction of light trapped in the HI layer will be between the corresponding fraction for the red and blue color channels. In at least some embodiments the HI layer 710 may support at least 50% of the angular FOV width $\Theta$ of at least one of the color channels of the image light.

Light propagating in the HI layer 710 may be diffracted out of the waveguide by out-coupler gratings 741 and 742, which may be generally disposed anywhere within the HI layer or at a surface thereof. The out-coupler gratings 741 and 742 may be configured so that the sum ($g_1+g_2$) of their grating vectors $g_1$ and $g_2$ equals to ($-g_0$), where $g_0$ is the grating vector of the in-coupler 730, so that successive diffraction from these two gratings de-couples the in-coupled light from the waveguide in the direction of its incidence upon the waveguide. In-coupled light that penetrates into the substrate 720 may be out-coupled from the waveguide by diffraction upon some combination of two or more of the first grating 741, the second grating 742, and an optional third grating 743 when present. In some embodiments the third out-coupler grating 743 may be configured so that the vector sum of its grating vector $g_3$ with the grating vector $g_1$ of the first grating 741 and the grating vector $g_0$ of the in-coupler 730 is substantially zero, so that a successive diffraction of the in-coupled light that propagates partly in the substrate 720 from the first and third gratings 741, 743 out-couples that light in the direction of its incidence upon the waveguide. In some embodiment the second grating 742 and the third grating 743 may have equal grating vectors $g_3=g_2$. In some embodiments the third grating 743 may be absent, and the in-coupled light that propagates partly in the substrate 720 may be out-coupled from the waveguide by successive diffractions from the first grating 741 and the second grating 742. In some embodiments a fourth grating 744 with a grating vector $g_4$ may be provided to decouple the substrate-penetrating in-coupled light from the waveguide in cooperation with one of the first grating 741, the second grating 742, or the third grating 743. The fourth grating 744 may be disposed for example at the outer substrate surface 703, where it may be superimposed or stacked with the third grating 743. In some embodiments the grating vector $g_4$ of the fourth grating 744 may be equal to the grating vector $g_1$ of the first grating 741.

Figure 12:
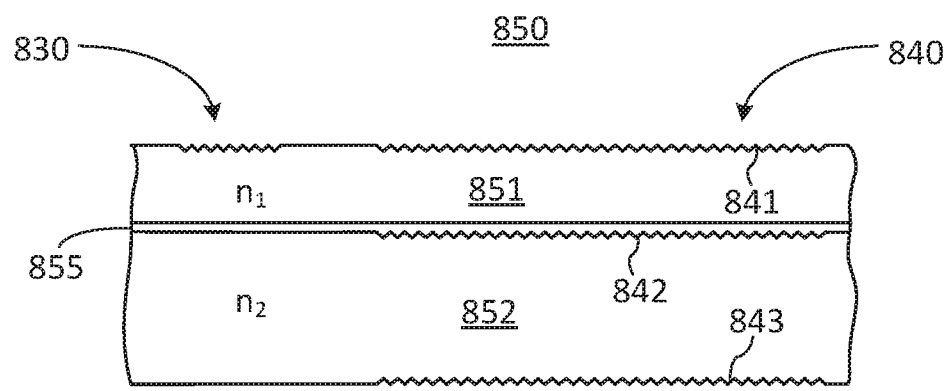
FIG. 12 is a schematic side cross-sectional view of a two-layer display waveguide with a capping layer over the interface grating.

FIG. 12 illustrates a two-layer display waveguide 850 according to an embodiment. The two-layer display waveguide 850 may be an embodiment of waveguide 700 described above. The two-layer display waveguide 850 includes substrate 852 of index $n_2$ as a first layer and an HI layer 851 of index $n_1 > n_2$ as a second layer. An in-coupler grating 830 is formed in or upon the HI layer 851 for example as a relief grating in a top surface of the HI layer. An out-coupler 840 may include a first grating 841, a second grating 842, and a third grating 843. Gratings 830, 841, 842, and 843 may be embodiments of gratings 730, 741, 742, and 743 of waveguide 700 described above. In one embodiment the two-layer display waveguide 850 may be formed by a process that includes i) forming the second and third gratings 842, 843 at opposite faces of substrate 852, for example as relief gratings by etching, ii) optionally depositing a thin capping layer over the second grating 842 to even the surface, and iii) depositing the HI layer 851 over the cap layer 855 or directly over the substrate 852. In one embodiment the cap layer 855 may itself include two or more layers. In one embodiment the substrate may be of optically transparent material with the refractive index in the range of 1.4 and 2.0, such as for example glass, which may be suitably doped, plastic, or any other suitable optical material with low optical loss and the refractive index in a desired range, e.g. from 1.5 to 1.9 as a non-limiting example. The HI layer 851 may be of optically transparent material with the refractive index that is greater than the refractive index of substrate 852, for example in the range of 2.2 and 2.6. Examples of higher-index material that may be suitable for the HI layer 851 include those listed above with reference to waveguide 700.

FIGS. 9A, 9B, 12 illustrate embodiments where the out-coupler gratings 741-743 are disposed at the opposite surfaces of the waveguide and at the substrate-layer interface. Variations of this embodiment with differently placed and/or differently configured gratings may also be envisioned. In at least some of those variations, the first and second gratings may be configured so as to redirect light trapped in the HI layer out of the waveguide. In some embodiments they may be formed in the interior of the HI layer, for example as a holographic grating. In some embodiments they may be superimposed in the interior of the HI layer, at the surfaces of the HI layer, or at the interface of the HI layer with the substrate. Similarly, the third grating that is configured to redirect in-coupled light not trapped in the HI layer may be formed in the interior of the substrate or the HI layer, or it may be superimposed with either one of the first and second gratings. In some embodiments, an out-coupler 740 may omit the third output grating.

The example multi-layer waveguide 700 illustrated in FIGS. 9A, 9B may be modified, for example by changing the order of layers and/or adding more layers. Embodiments may be envisioned where image light enters the waveguide body through a substrate, and is then injected into an HI layer for trapping therein by an input grating formed in the HI layer or at a surface thereof. For example, in a modified embodiments of FIG. 9A, image light 711 may enter waveguide 700 through an outer surface 703 of substrate 720, and get coupled into the HI layer 710 by the input gratings 730 configured to operate in reflection. In another embodiment, the input grating 730 may be formed within the HI layer 710 or at the interface 702 of the HI layer 710 and substrate 720. In another embodiment an additional layer may be disposed over the HI layer, for example with a lower refractive index than that of the HI layer.

Figure 13:
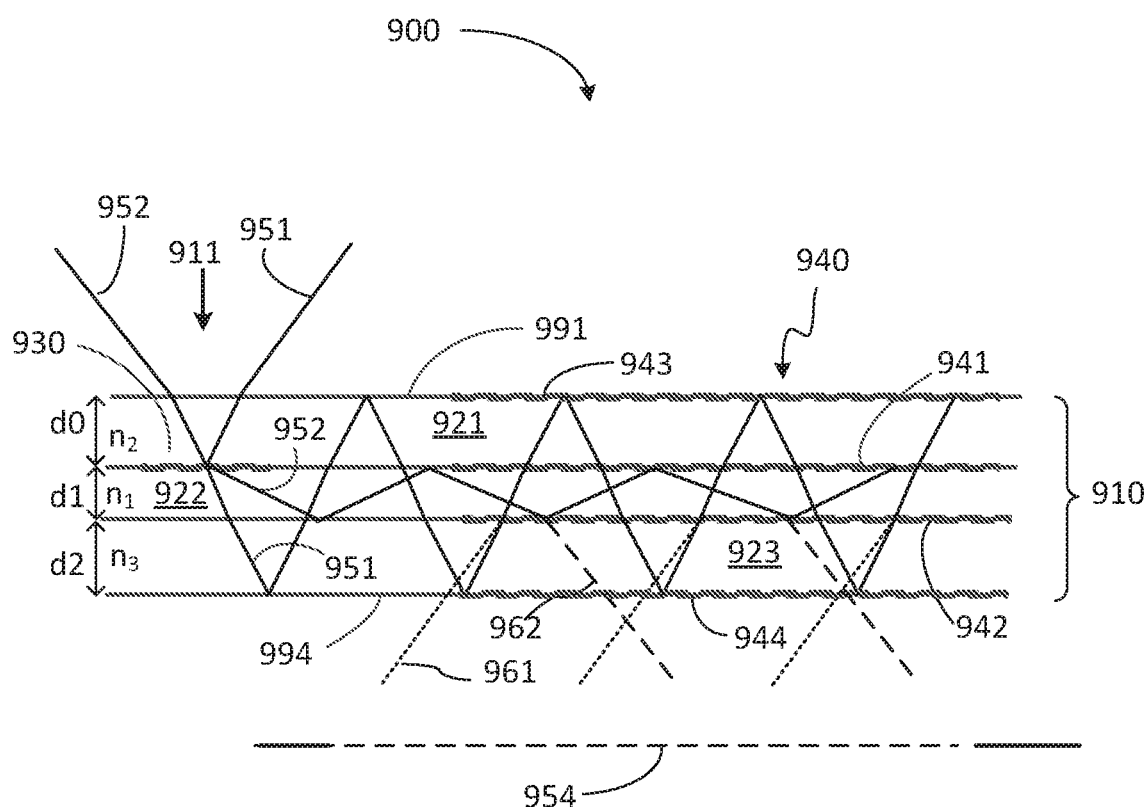
FIG. 13 is a schematic side cross-sectional view of a three-layer display waveguide illustrating the coupling of rays of image light at opposite ends of the FOV.

Referring to FIG. 13, there is illustrated an example embodiment of a multi-layer waveguide 900 having a waveguide body 910 comprised of a center layer 922 of thickness $d_1$, and two outer layers 921, 923 of thicknesses $d_0$ and $d_2$, respectively. The multi-layer waveguide 900 may be an embodiment of waveguides 120 and 410 described above.

The three layers 921, 922, 923 may be transparent to light of the operating spectral range, such as visible light, and may form a contiguous waveguide body 910. The center layer 922 may have a greater refractive index $n_1$ than refractive indices $n_2$ and $n_3$ of the two outer layers 921, 923. The refractive indices $n_2$ and $n_3$ may be the same or different. In some embodiment the refractive index difference between the center layer and the outer layers may be in the range of 0.3 to 1, or in some embodiments in the range of 0.4 to 0.7. In some embodiments the outer layers 921, 923 may have the same refractive index $n_2 = n_3$, although embodiments may be envisioned where the outer layers 921, 923 have differing refractive indices. In some embodiments the refractive index of one of the outer layers 921, 923 may be greater than of the other two layers. An in-coupler 930 is configured to couple at least a portion of the image light into the HI layer 922 for propagating therein toward an out-coupler 940. The in-coupler 930 may include, or be in the form of, one or more input gratings that may be formed in the HI layer 922 or at an interface thereof with one of the outer layers; in the illustrated embodiment the in-coupler 930 is implemented as an input grating 930, which is disposed at the interface between the top outer layer 921 and the HI layer 922 and operates in transmission. The out-coupler 940 is spatially offset from the in-coupler in the plane of the waveguide and is configured to de-couple image light propagating in the waveguide toward a viewing area or eyebox 954. In some embodiments the out-coupler 940 is formed with two output gratings 941 and 942 that may be formed at the interfaces of the HI layer 922 with the outer layers 921, 922. In some embodiments one or both of the output gratings 941 and 942 may be formed within the HI layer 922. In some embodiments the output gratings 941 and 942 may be superimposed. The input grating 930 and the output gratings 941, 942 may be configured so that their grating vectors sum substantially to zero, up to a fabrication accuracy. In some embodiments the out-coupler 940 may include additional output gratings, for example to diffract light propagating in at least one of the outer layers 921, 923. In some embodiments the out-coupler 940 may include two additional gratings 943, 944 for out-coupling light propagating in the first 921 and the third 923 layers. In some embodiments these two additional gratings may be disposed at the outer surfaces 991 and 994 of the waveguide 900.

FIG. 13 schematically illustrates the propagation of two rays 951, 952 of image light 911 in an embodiment of waveguide 910 with a central layer 922 having a greater refractive index $n_1$ and two outer layers of smaller refractive indices $n_2$ and $n_3$. The two rays 951 and 952 may correspond to opposite edges of a FOV of waveguide 900, with the propagation angle $\beta_{TIR}$ of ray 951 defined by the TIR condition at the outer faces 991, 994 of waveguide 900. In the absence of the central HI layer 922, ray 952 would have propagated in the waveguide at a nearly-glancing angle $\beta_{max}$, resulting in a large discrepancy between the two rays 951, 952 in the number of ray-grating interactions along the length of the out-coupler 940. By way of example, for $n_2 = n_3 = 1.9$, the "glancing" ray 952 propagating in the waveguide at a maximum angle $\beta_{max} = 75$ deg would have about 6 times fewer bounces in the waveguide and interactions with the output grating than the TIR-limited ray 951, with the ratio increasing to 18 when considering even more "glancing" rays at $\beta_{max} = 85$ deg.

The central HI layer 922 is configured to trap the "glancing" ray 952 by TIR within itself, generally in a way similar to that described above with reference to FIGS. 9A and 9B in relation to the HI layer 710. By suitably selecting the thicknesses $d_0$, $d_1$, and $d_2$ of the layers in dependences on their refractive indices, the difference in the number of relevant ray-grating interactions along the out-coupler 940 for rays 951 and 952 at the opposite edges of the waveguide's FOV may be substantially reduced, generally by approximately a thickness ratio $d_1/d$, where d is the total thickness of waveguide 910. This is illustrated in FIG. 13, schematically showing out-coupled rays 961 (dotted lines) and 962 (dashed lines) produced by consecutive diffractions of rays 951 and 952, respectively, off the output gratings 941 and 942, as image light corresponding to these rays propagate along the out-coupler 940. As can be seen in the figure, the distance between consecutive diffraction events for rays 952 and 951 may be approximately the same, despite a large discrepancy of their propagation angles in the HI layer 922. By way of non-limiting example, the thickness $d_1$ of the HI layer may be in the range of 20 to 50% of the total thickness d of the waveguide.

Figure 14:
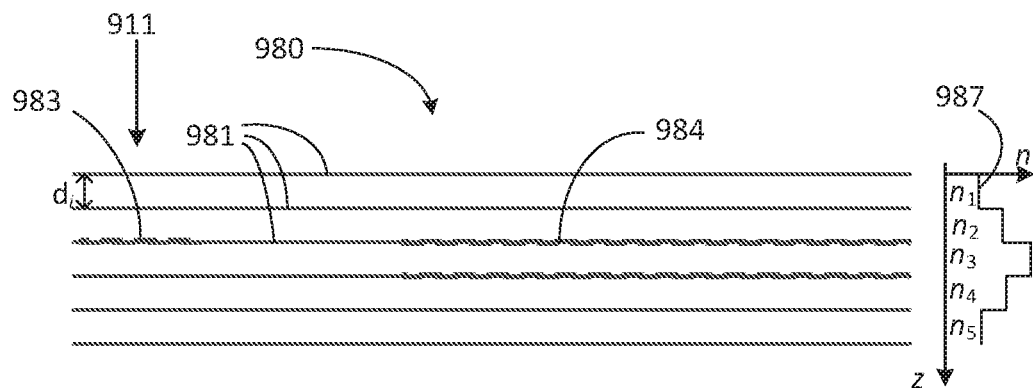
FIG. 14 is a schematic side cross-sectional view of a multi-layer display waveguide with five layers of different refractive indices.

Turning now to FIG. 14, there is illustrated an example multi-layer display waveguide 980 having a contiguous waveguide body formed of a plurality of optically transparent layers 981 with varying refractive indices. Waveguide 980, which may be a planar waveguide, is shown in the figure in a cross-section by a plane perpendicular to the outer optical faces thereof. Waveguide 980 may be an embodiment of waveguides 120 and 410 described above. In the illustrated embodiment five layers 981 are shown by way of example, although the number of layers in the waveguide may be different in other embodiments. An insert at the right of FIG. 14 is a plot illustrating the refractive indices $n_i$ of the layers, i=1, . . . , 5. In the illustrated example, the refractive index is greatest for the middle layer, and decreases toward the outer faces of the waveguide; however embodiments where any of the other four layers has the greatest index in the waveguide may also be envisioned. For example, in one embodiment the two top layers or the two bottom layers may be omitted, so that the highest-index layer is adjacent to an outer surface of the waveguide. The amplitude $\Delta n$ of refractive index variation in the direction of the waveguide's thickness, z-axis in the figure, may be greater than about 0.3, or preferably greater than about 0.4. The refractive indices $n_i$ and thicknesses $d_i$ of the layers may be selected so as to confine more "gliding" rays within a narrower portion of the waveguide's body than rays coupled into the waveguide at smaller propagation angles $\beta$. An in-coupler 983 may be disposed to couple at least some portion of image light 911 into a high-index layer or layers of the waveguide; for example the in-coupler 983 may be implemented as a diffraction grating disposed at an interface of the central layer proximate to a source of image light (not shown). An out-coupler 984 may be laterally offset from the in-coupler 983 and disposed to re-direct in-coupled image light out of the waveguide, including light confined in the high-index portion of the waveguide. For example the out-coupler 983 may be implemented with two diffraction gratings that may be disposed at the interfaces of the central layer with outer lower-index layers, as illustrated in FIG. 14. In some embodiments one or more additional input gratings and/or additional output gratings may be provided.

Figure 15:
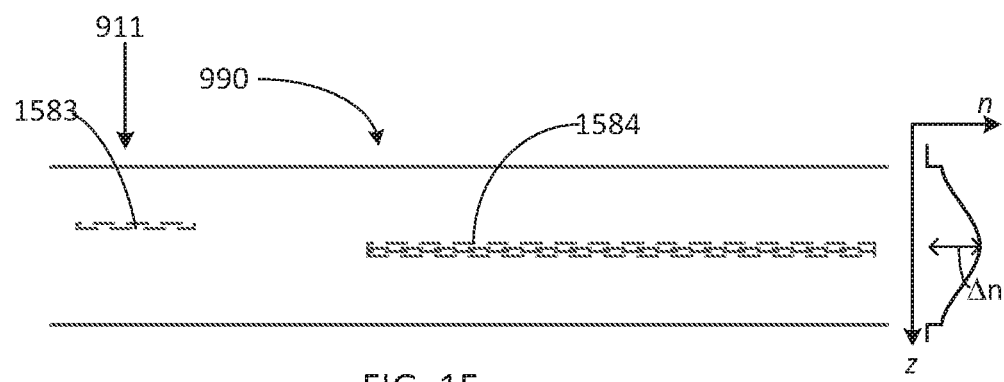
FIG. 15 is a schematic side cross-sectional view of a gradient-index display waveguide.

Turning now to FIG. 15, there is illustrated an example gradient-index display waveguide 990 having a refractive index n continuously varying in the direction of waveguide thickness, i.e. along the z-axis in the figure. Waveguide 990, which may be a planar waveguide, is shown in the figure in a cross-section by a plane perpendicular to the outer faces thereof. Waveguide 990 may be an embodiment of waveguides 120 and 410 described above. An insert at the right of FIG. 15 is a plot illustrating the refractive index as a function n=n(z) of the "depth" coordinate z. In the illustrated example the waveguide is symmetrical in the "depth" direction (z-axis) with the greatest refractive index in the middle of the waveguide's body; however embodiments with an asymmetrical index distribution of the refractive index relative to the outer faces of the waveguide may also be envisioned, some of which may have the location of the greatest index closer to one of the outer waveguide faces than to the other, including when the highest index portion is next to an outer surface of the waveguide. The amplitude $\Delta n$ of refractive index variation in the direction of the waveguide's thickness, z-axis in the figure, may be greater than about 0.3, or preferably greater than about 0.4. The distribution of the refractive index n(z) as a function of the "depth" coordinate z may be optimized so as to confine more "gliding" rays within a narrower portion of the waveguide's body than rays coupled into the waveguide at smaller propagation angles $\beta$. In-coupler 1583 and out-coupler 1584 may be implemented with diffraction gratings disposed in a higher-index portion of the waveguide to couple at least some of image light 911 into the higher-index portion and to decouple the in-coupled light out of the waveguide, generally as described above with reference to FIGS. 9A, 9B, 12-14. For example the out-coupler 1584 may be implemented with two diffraction gratings that may be disposed close to each other or super-imposed in a middle portion of the waveguide in the high-index region thereof. A gradient-index implementation may have some advantages over a multi-layer implementation with abrupt steps in the refractive index at the layer interfaces. These advantages may include avoiding reflections of the image light off the refractive index steps, and a better homogenization of the pupil replication density across different colors and angles of incidence of the image light. A gradient-index planar waveguide as described above may be implemented, for example, by layer fusion, Embodiments described above with reference to FIGS. 9A-15 are examples of a display waveguide for conveying image light in a display system, the waveguide having a contiguous waveguide body with two outer surfaces and a thickness therebetween, and a refractive index that varies in the direction of the thickness. The waveguide further includes an input coupler disposed in the input area and configured to couple the image light into the waveguide body for propagating toward the output area, and an output coupler disposed in the output area and configured to couple the image light out of the waveguide body for propagating toward an eyebox. The waveguide body has an input area and an output area offset therefrom, and is configured to guide image light from the input area toward the output area. In some embodiments, such as those described above with reference to FIGS. 13-15, the refractive index is greater in a middle portion of the waveguide body between the outer surfaces than in portions of the waveguide body adjacent to the outer surfaces. In some embodiments, such as those described above with reference to FIGS. 9A-12, the refractive index is greater in a portion of the waveguide body adjacent to one of the outer surfaces thereof.

Embodiments described above implement a method for conveying image light from an image light source to an eye box with a waveguide by selectively confining a first portion of the image light in a smaller volume of the waveguide's body than a second portion of the image light for equalizing conditions of their de-cooping out of the waveguides.

In some embodiments the method may include: directing the image light onto an input area of a waveguide comprising two opposed outer surfaces and a high-index portion therebetween, the high-index portion extending from the input area of the waveguide to an output area thereof, the high-index portion having a greater refractive index than a portion of the waveguide body adjacent to one of the opposed outer surfaces thereof; coupling the image light into the waveguide body at a range of propagation angles comprising a first propagation angle and a second propagation angle; and, propagating the image light in the waveguide from the input area to the output area so that first rays of the image light coupled into the waveguide at the first propagation angle are guided toward the output area by total internal reflection at the opposed outer surfaces of the waveguide, while second rays of the image light coupled into the waveguide at the second propagation angle propagate toward the output area within the high-index portion of the waveguide body.

In some embodiments the method may include: directing the image light onto an input area of a waveguide comprising two opposed outer surfaces and a middle portion therebetween, the middle portion extending from the input area of the waveguide to an output area thereof, the middle portion having a greater refractive index than portions of the waveguide body adjacent to the opposed outer surfaces thereof; coupling the image light into the waveguide body at a range of propagation angles comprising a first propagation angle and a second propagation angle; and, propagating the image light in the waveguide from the input area to the output area so that first rays of the image light coupled into the waveguide at the first propagation angle are guided toward the output area by total internal reflection at the opposed outer surfaces of the waveguide, while second rays of the image light coupled into the waveguide at the second propagation angle propagate toward the output area within the middle portion of the waveguide body.

Figure 16:
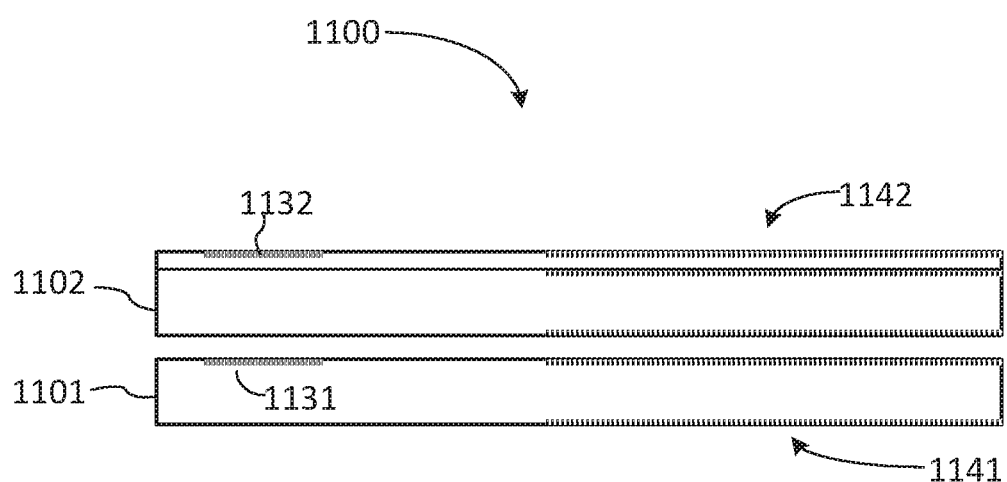
FIG. 16 is a schematic side cross-sectional view of a two-waveguide stack including a two-layer waveguide.

Referring to FIG. 16, in some embodiments a multi-layer or gradient-index waveguide, such as a two-layer waveguide 1102 illustrated by way of example, may be combined with a second waveguide 1101 to form a waveguide stack 1100. Waveguide 1102 may be as described above with reference to any of FIGS. 9A-15. The second waveguide may be a single-layer waveguide of the type shown in FIGS. 2-4, or any of the multi-layer or gradient-index waveguide described above with the refractive index varying in the direction of the waveguide thickness. A gap may separate the two-layer waveguide 1102 and the second waveguide 1101. The gap may be an airgap, a vacuum gap, or it may include a material of lower refractive index than that of the waveguides. The in-couplers 1131, 1132 and out-couplers 1141, 1142 of the waveguides may be optimized for different wavelength ranges. For example, the in-coupler 1132 and the out-coupler 1142 of the two-layer waveguide 1102 may be optimized to couple light of the blue and green color channels, while the in-coupler 1131 and the out-coupler 1141 of the second waveguide 1101 may be optimized to couple light of the red color channel. In some embodiments light of one or more color channels may be conveyed by each of the two waveguides, for example depending on the angle of incidence.

Figure 17A:
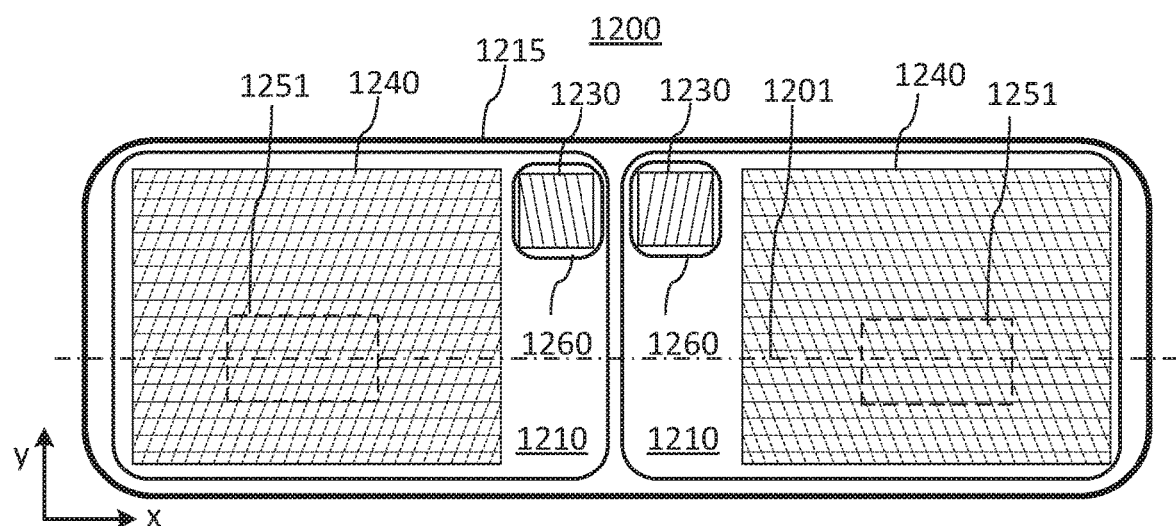
FIG. 17A is a schematic plan view of a binocular NED with two pupil-expanding waveguides and in-couplers diagonally offset from exit pupils of the out-couplers.
Figure 17B:
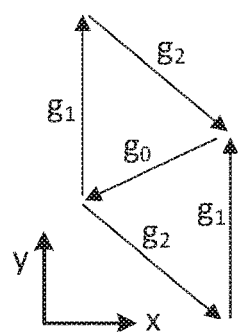
FIG. 17B is a schematic vector diagram illustrating grating vectors for the example layout of FIG. 17A.

FIG. 17A schematically illustrates an example layout of a binocular near-eye display (NED) 1200 that includes two waveguide assemblies 1210 supported by a frame or frames 1215. Each of the waveguide assemblies 1210 is configured to convey image light from a display projector 1260 to a different eye of a user. The in-couplers 1230 may be provided with a common micro-display projector or two separate micro-display projectors 1260, which may be disposed to project image light toward the corresponding in-couplers 1230. Waveguide assemblies 1210 may each be in the form of, or include, a single multi-layer or gradient-index waveguide that may be configured to guide polychromatic light in a target FOV as described above. Each waveguide includes an in-coupler 1230 and an out-coupler 1240, with each in-coupler diagonally aligned with the corresponding out-coupler. In other embodiments the placement of the in-couplers 1230 in the periphery of the corresponding out-couplers 1240 may be different. Each out-coupler 1240 includes an eyebox projection area 1251, which may also be referred to as the exit pupil of the waveguide, and from which in operation the image light is projected to an eye of the user. An eye box is a geometrical area where a good-quality image may be presented to a user's eye, and where in operation the user's eye is expected to be located. The eyebox projection areas 1251 may be disposed on an axis 1201 that connects their centers. The axis 1201 may be suitably aligned with the eyes of the user wearing the NED, or be at least parallel to a line connecting the eyes of the user, and may be referred to as the horizontal axis (x-axis). The in-couplers 1230 may be in the form of diffraction gratings with grating vectors $g_0$ that may be directed generally toward the eyebox projection areas 1251 of respective waveguide assemblies. Each out-coupler 1240 may be in the form of two diffraction gratings, with the grating vectors $g_1$ and $g_2$ of the respective gratings oriented at an angle to each other. These gratings may be disposed at high-index portions of each waveguide to couple image light therein, and to de-couple light propagating in the high-index layer or region out of the waveguide as described above. The gratings of the in-coupler and out-coupler may be configured to satisfy a vector diagram illustrated in FIG. 17B. In some embodiments each waveguide assembly 1210 may be in the form of, or include, a waveguide stack with two or more waveguides as described above, with the grating vectors $g_0$, $g_1$ and $g_2$ that may be different in length for each waveguide of the stack and may be optimized for conveying different color channels. In some embodiments the gratings of each waveguide of the stack may be configured so at to avoid, or at least lessen, the leakage of once-diffracted ambient light into the supported FOV, or at least a pre-defined central portion of the supported FOV, as described above.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 18A:
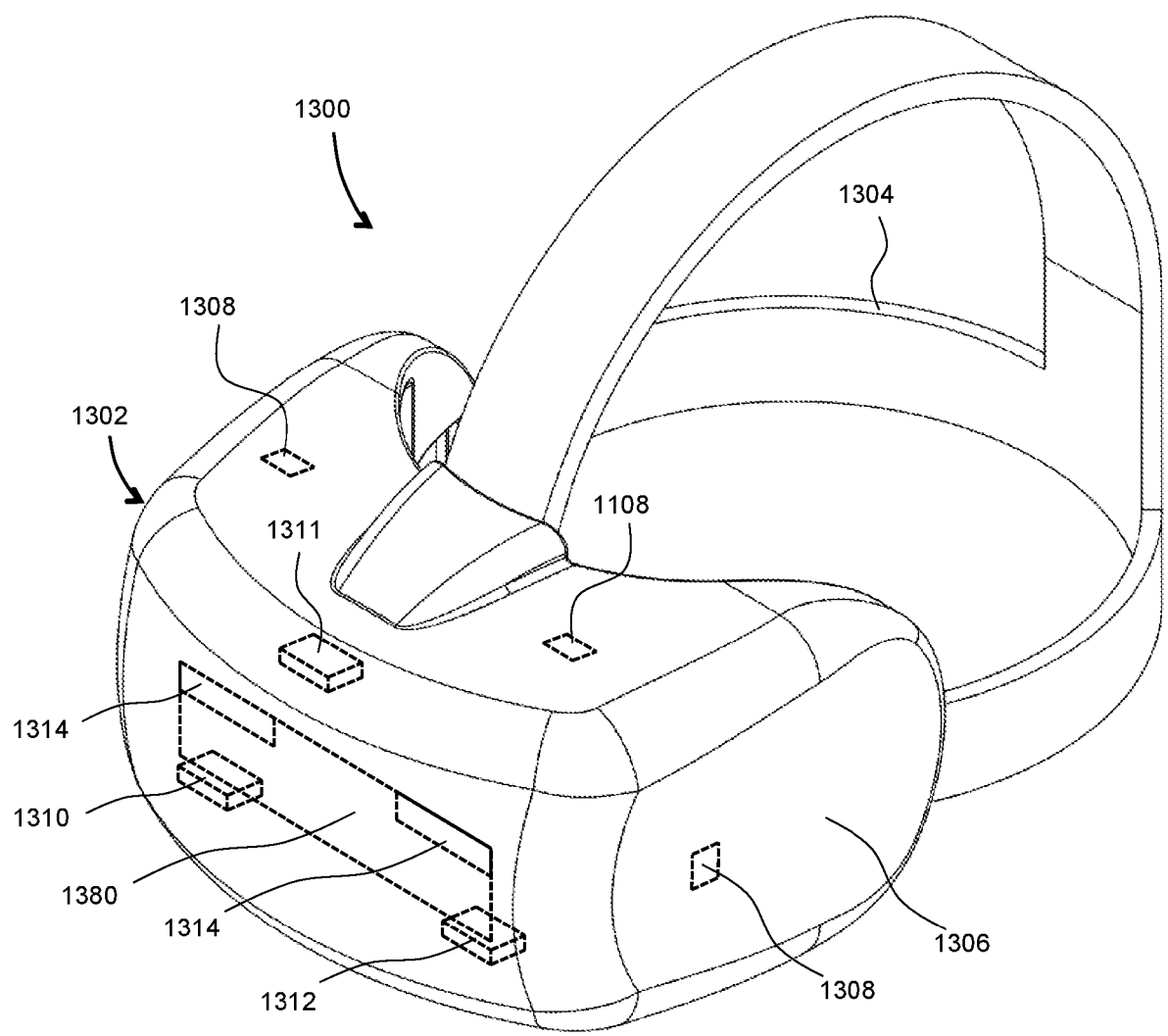
FIG. 18A is an isometric view of a head-mounted display of the present disclosure.

Referring to FIG. 18A, an HMD 1300 is an example of an AR/VR wearable display system which encloses the user's face, for a greater degree of immersion into the AR/VR environment. The HMD 1300 may be an embodiment of the waveguide display 100 of FIG. 1A or the NED 1200 of FIG. 17A, for example. The function of the HMD 1300 is to augment views of a physical, real-world environment with computer-generated imagery, and/or to generate the entirely virtual 3D imagery. The HMD 1300 may include a front body 1302 and a band 1304. The front body 1302 is configured for placement in front of eyes of a user in a reliable and comfortable manner, and the band 1304 may be stretched to secure the front body 1302 on the user's head. A display system 1380 may be disposed in the front body 1302 for presenting AR/VR imagery to the user. Sides 1306 of the front body 1302 may be opaque or transparent. The display system 1380 may include a display waveguide as described above coupled to image projectors 1314.

In some embodiments, the front body 1302 includes locators 1308 and an inertial measurement unit (IMU) 1310 for tracking acceleration of the HMD 1300, and position sensors 1312 for tracking position of the HMD 1300. The IMU 1310 is an electronic device that generates data indicating a position of the HMD 1300 based on measurement signals received from one or more of position sensors 1312, which generate one or more measurement signals in response to motion of the HMD 1300. Examples of position sensors 1312 include: one or more accelerometers, one or more gyroscopes, one or more magnetometers, another suitable type of sensor that detects motion, a type of sensor used for error correction of the IMU 1310, or some combination thereof. The position sensors 1312 may be located external to the IMU 1310, internal to the IMU 1310, or some combination thereof.

The locators 1308 are traced by an external imaging device of a virtual reality system, such that the virtual reality system can track the location and orientation of the HMD 1300. Information generated by the IMU 1310 and the position sensors 1312 may be compared with the position and orientation obtained by tracking the locators 1308, for improved tracking accuracy of position and orientation of the HMD 1300. Accurate position and orientation is important for presenting appropriate virtual scenery to the user as the latter moves and turns in 3D space.

The HMD 1300 may further include a depth camera assembly (DCA) 1311, which captures data describing depth information of a local area surrounding some or all of the HMD 1300. To that end, the DCA 1311 may include a laser radar (LIDAR), or a similar device. The depth information may be compared with the information from the IMU 1310, for better accuracy of determination of position and orientation of the HMD 1300 in 3D space.

The HMD 1300 may further include an eye tracking system for determining orientation and position of user's eyes in real time. The determined position of the user's eyes allows the HMD 1300 to perform (self-) adjustment procedures. The obtained position and orientation of the eyes also allows the HMD 1300 to determine the gaze direction of the user and to adjust the image generated by the display system 1380 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1302.

Figure 18B:
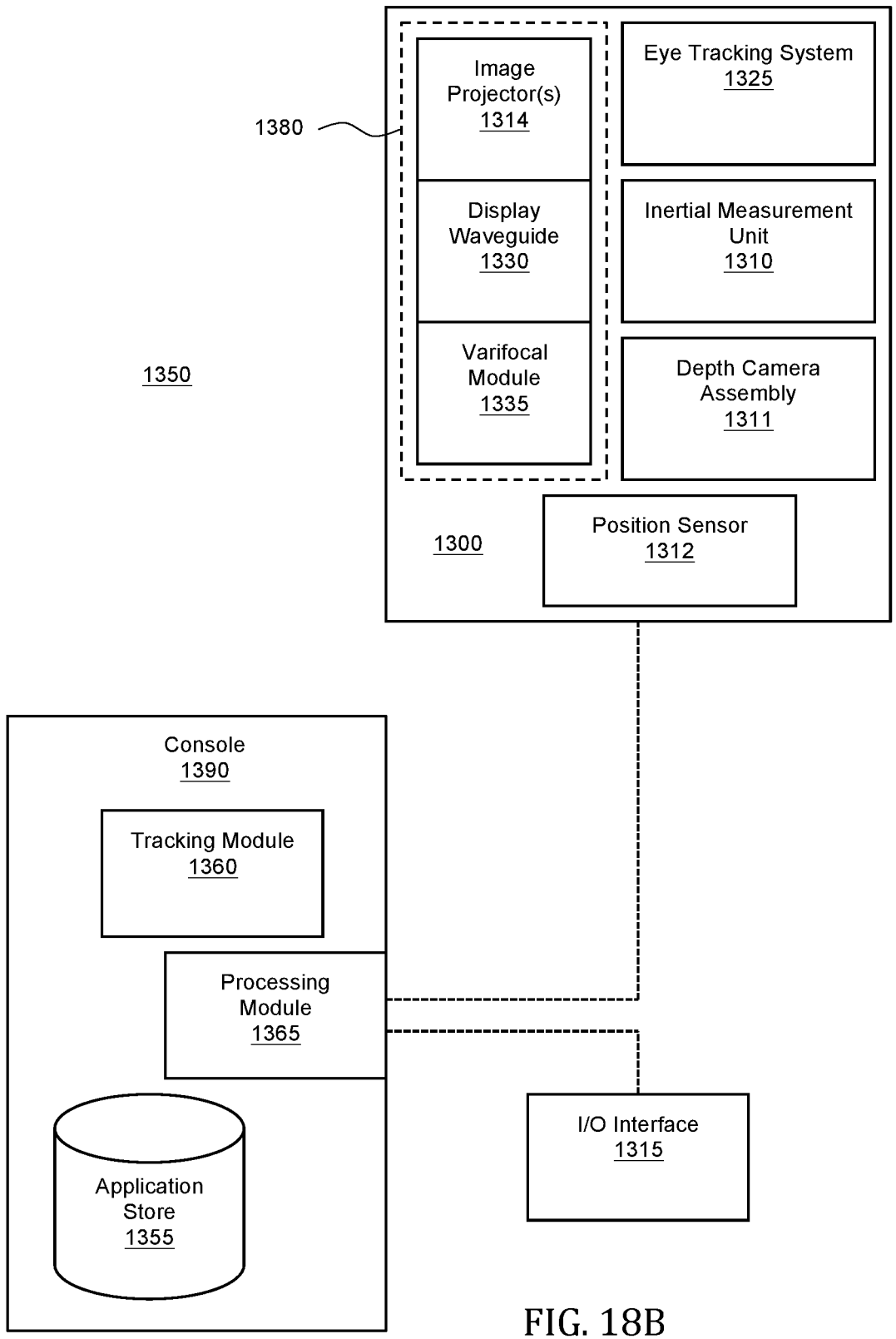
FIG. 18B is a block diagram of a virtual reality system including the headset of FIG. 18A.

Referring to FIG. 18B, an AR/VR system 1350 may be an example implementation of the waveguide display 100 of FIG. 1A, or the NED 1200 of FIG. 17A. The AR/VR system 1350 includes the HMD 1300 of FIG. 18A, an external console 1390 storing various AR/VR applications, setup and calibration procedures, 3D videos, etc., and an input/output (I/O) interface 1315 for operating the console 1390 and/or interacting with the AR/VR environment. The HMD 1300 may be "tethered" to the console 1390 with a physical cable, or connected to the console 1390 via a wireless communication link such as Bluetooth®, Wi-Fi, etc. There may be multiple HMDs 1300, each having an associated I/O interface 1315, with each HMD 1300 and I/O interface(s) 1315 communicating with the console 1390. In alternative configurations, different and/or additional components may be included in the AR/VR system 1350. Additionally, functionality described in conjunction with one or more of the components shown in FIGS. 18A and 18B may be distributed among the components in a different manner than described in conjunction with FIGS. 18A and 18B in some embodiments. For example, some or all of the functionality of the console 1315 may be provided by the HMD 1300, and vice versa. The HMD 1300 may be provided with a processing module capable of achieving such functionality.

As described above with reference to FIG. 18A, the HMD 1300 may include an eye tracking system 1325 for tracking eye position and orientation, determining gaze angle and convergence angle, etc., the IMU 1310 for determining position and orientation of the HMD 1300 in 3D space, the DCA 1311 for capturing the outside environment, the position sensor 1312 for independently determining the position of the HMD 1300, and the display system 1380 for displaying AR/VR content to the user. The display system 1380 includes (FIG. 18B) one or more image projectors 1314, such as one or more scanning projectors or one or more electronic displays, including but not limited to a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1380 further includes a display waveguide 1330, whose function is to convey the images generated by the image projector 1314 to the user's eye. The display system 1380 may further include an optics block 1335, which may in turn include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. In some embodiments the optics block 1335 may include a varifocal functionality a varifocal module to adjust the focus of the optics block 1330 e.g. to compensate for vergence-accommodation conflict, to correct for vision defects of a particular user, to offset aberrations, etc.

The I/O interface 1315 is a device that allows a user to send action requests and receive responses from the console 1390. An action request is a request to perform a particular action. For example, an action request may be an instruction to start or end capture of image or video data or an instruction to perform a particular action within an application. The I/O interface 1315 may include one or more input devices, such as a keyboard, a mouse, a game controller, or any other suitable device for receiving action requests and communicating the action requests to the console 1390. An action request received by the I/O interface 1315 is communicated to the console 1390, which performs an action corresponding to the action request. In some embodiments, the I/O interface 1315 includes an IMU that captures calibration data indicating an estimated position of the I/O interface 1315 relative to an initial position of the I/O interface 1315. In some embodiments, the I/O interface 1315 may provide haptic feedback to the user in accordance with instructions received from the console 1390. For example, haptic feedback can be provided when an action request is received, or the console 1390 communicates instructions to the I/O interface 1315 causing the I/O interface 1315 to generate haptic feedback when the console 1390 performs an action.

The console 1390 may provide content to the HMD 1300 for processing in accordance with information received from one or more of: the IMU 1310, the DCA 1311, the eye tracking system 1325, and the I/O interface 1315. In the example shown in FIG. 18B, the console 1390 includes an application store 1355, a tracking module 1360, and a processing module 1365. Some embodiments of the console 1390 may have different modules or components than those described in conjunction with FIG. 18B. Similarly, the functions further described below may be distributed among components of the console 1390 in a different manner than described in conjunction with FIGS. 18A and 18B.

The application store 1355 may store one or more applications for execution by the console 1390. An application is a group of instructions that, when executed by a processor, generates content for presentation to the user. Content generated by an application may be in response to inputs received from the user via movement of the HMD 1300 or the I/O interface 1315. Examples of applications include: gaming applications, presentation and conferencing applications, video playback applications, or other suitable applications.

The tracking module 1360 may calibrate the AR/VR system 1350 using one or more calibration parameters and may adjust one or more calibration parameters to reduce error in determination of the position of the HMD 1300 or the I/O interface 1315. Calibration performed by the tracking module 1360 also accounts for information received from the IMU 1310 in the HMD 1300 and/or an IMU included in the I/O interface 1315, if any. Additionally, if tracking of the HMD 1300 is lost, the tracking module 1360 may re-calibrate some or all of the AR/VR system 1350.

The tracking module 1360 may track movements of the HMD 1300 or of the I/O interface 1315, the IMU 1310, or some combination thereof. For example, the tracking module 1360 may determine a position of a reference point of the HMD 1300 in a mapping of a local area based on information from the HMD 1300. The tracking module 1360 may also determine positions of the reference point of the HMD 1300 or a reference point of the I/O interface 1315 using data indicating a position of the HMD 1300 from the IMU 1310 or using data indicating a position of the I/O interface 1315 from an IMU included in the I/O interface 1315, respectively. Furthermore, in some embodiments, the tracking module 1360 may use portions of data indicating a position or the HMD 1300 from the IMU 1310 as well as representations of the local area from the DCA 1311 to predict a future location of the HMD 1300. The tracking module 1360 provides the estimated or predicted future position of the HMD 1300 or the I/O interface 1315 to the processing module 1365.

The processing module 1365 may generate a 3D mapping of the area surrounding some or all of the HMD 1300 ("local area") based on information received from the HMD 1300. In some embodiments, the processing module 1365 determines depth information for the 3D mapping of the local area based on information received from the DCA 1311 that is relevant for techniques used in computing depth. In various embodiments, the processing module 1365 may use the depth information to update a model of the local area and generate content based in part on the updated model.

The processing module 1365 executes applications within the AR/VR system 1350 and receives position information, acceleration information, velocitynformation, predicted future positions, or some combination thereof, of the HMD 1300 from the tracking module 1360. Based on the received information, the processing module 1365 determines content to provide to the HMD 1300 for presentation to the user. For example, if the received information indicates that the user has looked to the left, the processing module 1365 generates content for the HMD 1300 that mirrors the user's movement in a virtual environment or in an environment augmenting the local area with additional content. Additionally, the processing module 1365 performs an action within an application executing on the console 1390 in response to an action request received from the I/O interface 1315 and provides feedback to the user that the action was performed. The provided feedback may be visual or audible feedback via the HMD 1300 or haptic feedback via the I/O interface 1315.

In some embodiments, based on the eye tracking information (e.g., orientation of the user's eyes) received from the eye tracking system 1325, the processing module 1365 determines resolution of the content provided to the HMD 1300 for presentation to the user with the image projector(s) 1314. The processing module 1365 may provide the content to the HMD 1300 having a maximum pixel resolution in a foveal region of the user's gaze. The processing module 1365 may provide a lower pixel resolution in the periphery of the user's gaze, thus lessening power consumption of the AR/VR system 1350 and saving computing resources of the console 1390 without compromising a visual experience of the user. In some embodiments, the processing module 1365 can further use the eye tracking information to adjust where objects are displayed for the user's eye to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide for conveying image light in a display system, the waveguide comprising:
   a waveguide body having two outer surfaces and a three-layer stack therebetween comprising a middle layer between two outer layers, the middle layer having a greater refractive index than the outer layers and a thickness in a range of 20% to 50% of a total thickness of the three-layer stack, the waveguide body comprising an input area and an output area and configured to guide a first portion of a first color channel of the image light received at the input area toward the output area by total internal reflection (TIR) at the outer surfaces, the three-layer stack being configured to guide a second portion of the first color channel substantially within the middle layer by reflections at boundaries between the middle and outer layers;
   an input coupler disposed in the input area and configured to couple the image light into the waveguide body for propagating toward the output area; and
   an output coupler disposed in the output area and configured to couple the image light out of the waveguide body for propagating toward an eyebox.

2. The waveguide of claim 1 wherein the input coupler is configured to couple the image light into the waveguide body in a range of propagation angles comprising a first propagation angle and a second propagation angle, so that first rays of the image light coupled into the waveguide body at the first propagation angle are guided toward the output area by TIR at the outer surfaces, while second rays of the image light coupled at the second propagation angle are guided to the output coupler within the middle layer without being reflected from the outer surfaces.

3. The waveguide of claim 1 wherein the input coupler comprises a first input grating disposed at least in part in the middle layer or at a surface thereof so as to inject the image light directly into the middle portion.

4. The waveguide of claim 1 wherein the output coupler comprises a first output grating disposed at least in part in the middle layer or at a surface thereof.

5. The waveguide of claim 4 wherein the output coupler comprises a second output grating configured to redirect the image light received from the first output grating out of the waveguide body.

6. The waveguide of claim 5 wherein the second output grating is disposed at least in part in the middle layer or at a surface thereof.

7. The waveguide of claim 1 wherein the output coupler comprises four diffraction gratings disposed at the outer surfaces and at interfaces of the middle and outer layers.

8. The waveguide of claim 1 wherein the middle layer is 2 to 5 times thinner than the waveguide body.

9. The waveguide of claim 1 wherein the input coupler comprises a first input grating disposed in the middle layer or at a surface thereof, and the output coupler comprises a first output gratings disposed in the middle layer or at a surface thereof.

10. The waveguide of claim 1 wherein the image light further comprises a second color channel, wherein the second color channel comprises longer wavelengths than the first color channel, and wherein the input coupler is configured so that at least a portion of the second color channel is guided to the output coupler within the middle layer by reflections at surfaces thereof, and the first color channel is guided to the output coupler partly outside the middle layer by the TIR at the outer surfaces.

11. The waveguide of claim 1 wherein the refractive index of the waveguide body varies from at least 2.3 in the middle layer to at most 1.9 at the outer surfaces.

12. The waveguide of claim 1 wherein the refractive index of the outer layers is in the range of 1.4 to 2.

13. A near-eye display (NED) device comprising:
    a support structure for wearing on a head of a user;
    a light projector carried by the support structure and configured to emit image light; and
    a first waveguide carried by the support structure and configured to convey at least a first portion of the image light from the light projector to an eyebox, the first waveguide comprising:
      a waveguide body having two outer surfaces and a three-layer stack therebetween comprising a middle layer between two outer layers, the middle layer having a greater refractive index than the outer layers and a thickness in a range of 20% to 50% of a total thickness of the three-layer stack, the waveguide body comprising an input area and an output area and configured to guide a first portion of a first color channel of the image light received at the input area toward the output area by total internal reflection (TIR) at the outer surfaces, the three-layer stack being configured to guide a second portion of the first color channel substantially within the middle layer by reflections at boundaries between the middle and outer layers;
      an input coupler configured to couple the first portion of the image light into the waveguide body; and
      an output coupler configured to couple the first portion of the image light out of the waveguide body for propagating toward an eyebox.

14. The NED device of claim 13, wherein the input coupler comprises a first input grating disposed at least in part in the middle layer or at a surface thereof, and the output coupler comprises a first output grating disposed at least in part in the middle layer or at a surface thereof, wherein the first output grating is spaced apart from the first input grating.

15. The NED device of claim 13 wherein the image light further comprises a second color channel, the second color channel comprising longer wavelengths than the first color channel, and wherein the input coupler is configured so that at least a portion of the second color channel is guided to the output coupler within the middle layer, and at least a portion of the first color channel is guided to the output coupler partly outside the middle layer by the TIR at the outer surfaces.

16. The NED device of claim 13 comprising a second waveguide carried by the support structure and configured to convey at least a second portion of the image light from the light projector to the eyebox, wherein the image light further comprises a second color channel, and wherein the first waveguide is configured to transmit the first color channel and the second waveguide is configured to transmit the second color channel.

17. A method for conveying image light from an image light source to an eyebox, the method comprising:
    directing the image light onto an input area of a waveguide comprising two opposed outer surfaces and a three-layer stack therebetween, the three-layer stack extending from the input area of the waveguide to an output area thereof and comprising a middle layer between two outer layers, the middle layer having a greater refractive index than the outer layers and a thickness in a range of 20% to 50% of a total thickness of the three-layer stack;
    coupling the image light into the waveguide at a range of propagation angles comprising a first propagation angle and a second propagation angle; and
    propagating a first color channel of the image light in the waveguide from the input area to the output area so that first rays of the first color channel of the image light coupled into the waveguide at the first propagation angle are guided toward the output area by TIR at the opposed outer surfaces of the waveguide, while second rays of the first color channel of the image light coupled into the waveguide at the second propagation angle propagate toward the output area within the middle layer by reflections at boundaries between the middle and outer layers.

18. The method of claim 17 comprising using at least one output grating disposed in the middle layer or at a surface thereof to couple the second rays out of the waveguide body.

19. The method of claim 17 comprising guiding the first color channel of the image light partly outside the middle layer, and guiding a second color channel of the image light predominantly within the middle layer.

* * * * *